US012787123B2

(12) United States Patent
Gardner et al.

(10) Patent No.: US 12,787,123 B2
(45) Date of Patent: Nov. 3, 2026

(54) HEATING UNITS FOR HEATING ENCLOSURES AND METHODS OF HEATING ENCLOSURES

(71) Applicant: Universal Analyzers, Inc., Carson City, NV (US)

(72) Inventors: Eric James Gardner, Reno, NV (US); Christopher Todd Brown, Reno, NV (US); Gary Arthur Evans, Dayton, NV (US)

(73) Assignee: UNIVERSAL ANALYZERS, INC., Carson City, NV (US)

( * ) Notice: Subject to any disclaimer, the term of this patent is extended or adjusted under 35 U.S.C. 154(b) by 1074 days.

(21) Appl. No.: 17/905,412

(22) PCT Filed: Mar. 24, 2021

(86) PCT No.: PCT/US2021/024019

§ 371 (c)(1),
(2) Date: Aug. 31, 2022

(87) PCT Pub. No.: WO2021/195304

PCT Pub. Date: Sep. 30, 2021

(65) Prior Publication Data

US 2023/0164886 A1 May 25, 2023

Related U.S. Application Data

(60) Provisional application No. 62/994,666, filed on Mar. 25, 2020.

(51) Int. Cl.
*H05B 3/06* (2006.01)

(52) U.S. Cl.
CPC .......... *H05B 3/06* (2013.01); *H05B 2203/02* (2013.01); *H05B 2203/021* (2013.01)

(58) Field of Classification Search
CPC .......... H05B 2203/02; H05B 2203/023; H05B 3/02; H05B 3/30; H05B 3/46; H05B 3/50;

(Continued)

(56) References Cited

U.S. PATENT DOCUMENTS 4,689,475 A 8/1987 Kleiner et al.
4,861,966 A 8/1989 Matthiesen et al.

(Continued)

OTHER PUBLICATIONS

Zhou, CN 208296294 U (Year: 2018).*

(Continued)

*Primary Examiner* — Vy T Nguyen
(74) *Attorney, Agent, or Firm* — CONLEY ROSE, P.C.

(57) ABSTRACT

A heating unit for heating an enclosure includes a base having a central axis, a first end, a second end axially opposite the first end, and a cavity extending axially from the first end. In addition, the heating unit includes a heater disposed in the cavity of the base. Further, the heating unit includes a heat sink mounted to the base. The heat sink includes a plurality of laterally spaced fins and a plurality of laterally spaced channels positioned between the plurality of fins. Still further, the heating unit includes a manifold coupled to the base. A surface of the manifold faces the base and the heat sink. The manifold includes a flow passage and a plurality of orifices in fluid communication with the flow passage. Each orifice has an outlet at the surface of the manifold that is aligned with one of the channels of the first heat sink.

14 Claims, 13 Drawing Sheets

(58) Field of Classification Search
CPC ........... F28D 2021/0071; F28D 9/0062; F28D 2021/0064; F28D 9/00; B01B 1/005; B60H 1/2225; F28F 3/027; F28F 3/025; F23K 5/22
USPC .......................................................... 392/484
See application file for complete search history.

(56) References Cited

U.S. PATENT DOCUMENTS

| | | | | |
|---|---|---|---|---|
| 6,349,760 | B1 | 2/2002 | Budelman | |
| 8,739,856 | B2 | 6/2014 | Fedorov | |
| 9,338,831 | B2 | 5/2016 | Bohlender et al. | |
| 9,661,688 | B2 | 5/2017 | Mangold | |
| 2003/0051501 | A1* | 3/2003 | Matsushima | F28D 7/082 165/157 |
| 2005/0224070 | A1 | 10/2005 | Hanai et al. | |
| 2008/0053383 | A1 | 3/2008 | Varacins et al. | |
| 2008/0179314 | A1 | 7/2008 | Colja et al. | |
| 2009/0188259 | A1 | 7/2009 | Colja et al. | |
| 2013/0201628 | A1* | 8/2013 | Aoki | F28F 9/262 361/699 |

OTHER PUBLICATIONS

Matoba, JP 2001332283 A (Year: 2001).*
PCT/US2021/024019 International Search Report and Written Opinion dated Jun. 4, 2021 (19 p.).
PCT/US2021/024019 Response to Written Opinion Dated Jun. 4, 2021 and Article 19 Amendments; Response filed Aug. 4, 2021 (14 p.).
EX Heat Industrial: Hazardous Area Electric Heaters and Controls (https://www.exheat.com/library/datasheet-fxs.pdf).
Stego USA: PTC Heater HG 140 | 15 W to 150 W (https://www.stego-usa.com/products/heating/heaters/hg-140-15w-150w/).
Canadian Office Action dated Mar. 6, 2026, for Canadian Application No. 3,176,855 (5 p.).

* cited by examiner

HEATING UNITS FOR HEATING ENCLOSURES AND METHODS OF HEATING ENCLOSURES

CROSS-REFERENCE TO RELATED APPLICATIONS

This application is a 35 U.S.C. § 371 U.S. National Phase entry of, and claims priority to, PCT/US2021/024019 filed Mar. 24, 2021, and entitled "Heating Units for Heating Enclosures and Methods of Heating Enclosures," which claims benefit of U.S. provisional patent application Ser. No. 62/994,666 filed Mar. 25, 2020, and entitled "Heating Units for Heating Enclosures and Methods of Heating Enclosures," each of which is hereby incorporated herein by reference in its entirety for all purposes.

STATEMENT REGARDING FEDERALLY SPONSORED RESEARCH OR DEVELOPMENT

Not applicable.

BACKGROUND

Enclosure heaters may be used to heat a volume of fluid within a container or housing. For example, enclosure heaters may be used in petrochemical plants to maintain a fluid stream at or above a particular temperature. In some applications, hardware associated with the enclosure heater may be limited to a predetermined maximum surface temperature, as established for example, by hazardous area safety regulations.

BRIEF SUMMARY

Embodiments of heating units for heating an enclosure are described herein. In an embodiment, a heating unit comprises a first base having a central axis, a first end, a second end axially opposite the first end, and a cavity extending axially from the first end. In addition, the heating unit comprises a first heater disposed in the cavity of the first base. Further, the heating unit comprises a first heat sink mounted to the first base, wherein the first heat sink has a central axis oriented parallel to the central axis of the first base, a first end proximal the first end of the first base, and a second end proximal the second end of the first base. The first heat sink includes a plurality of laterally spaced fins and a plurality of laterally spaced channels. Each channel is laterally positioned between a pair of laterally adjacent fins of the plurality of fins. Still further, the heating unit comprises a manifold coupled to the first end of the first base. The manifold has a central axis, a first end, a second end axially opposite the first end, and an outer surface. The outer surface of the manifold includes a first surface extending axially from the first end to the second end. The first surface of the manifold faces the first base and the first heat sink. The manifold includes a first flow passage and a first plurality of orifices in fluid communication with the first flow passage. Each orifice of the first plurality of orifices has an outlet at the first surface that is aligned with one of the channels of the first heat sink. The first flow passage and the first plurality of orifices are configured to flow a fluid into and through the channels of the first heat sink.

In another embodiment, a heating unit for heating an enclosure comprises a base having a central axis, a first end, a second end axially opposite the first end, and a cavity extending axially from the first end. In addition, the heating unit comprises a positive temperature coefficient (PTC) heater disposed in the cavity of the base. The PTC heater slidingly engages the base and is configured to conductively transfer thermal energy to the base. Further, the heating unit comprises a heat sink mounted to the first base. The heat sink has a central axis oriented parallel to the central axis of the first base, a first end, and a second end axially opposite the first end of the base. The heat sink includes a plurality of laterally spaced fins and a plurality of laterally spaced channels. Each fin and each channel extends axially from the first end of the heat sink to the second end of the heat sink. Each channel is laterally positioned between a pair of laterally adjacent fins of the plurality of fins. The base is configured to conductively transfer thermal energy to the heat sink. Still further, the heating unit comprises a manifold coupled to the first end of the first base. The manifold has a central axis, a first end, a second end axially opposite the first end, and an outer surface. The outer surface of the manifold includes a first surface extending axially from the first end to the second end. The first surface of the manifold is adjacent the first end of the base and the first end of the heat sink. The manifold includes a flow passage and a plurality of orifices in fluid communication with the first flow passage. Each orifice of the first plurality of orifices has an outlet at the first surface in fluid communication with one of the channels. The first flow passage and the first plurality of orifices are configured to flow a fluid into and through the channels of the first heat sink along the plurality of fins.

Embodiments of methods for heating an enclosure with a heating unit are disclosed herein. In an embodiment, a method comprises (a) heating a first base of the heating unit with a first positive thermal coefficient (PTC) heater. In addition, the method comprises (b) transferring thermal energy from the first base to a plurality of fins of a first heat sink coupled to the first base during (a). The plurality of fins of the first heat sink are oriented parallel to each other. Further, the method comprises (c) flowing a fluid into a manifold coupled to the first base during (a) and (b). Still further, the method comprises (d) flowing the fluid through a first plurality of orifices of the manifold and into a plurality of channels of the first heat sink during (c). Each channel of the first heat sink is positioned between a pair of adjacent fins of the plurality of fins of the first heat sink and each orifice of the first plurality of orifices is aligned with one of the channels of the first heat sink.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION OF EXEMPLARY DISCLOSED EMBODIMENTS

Figure 1:
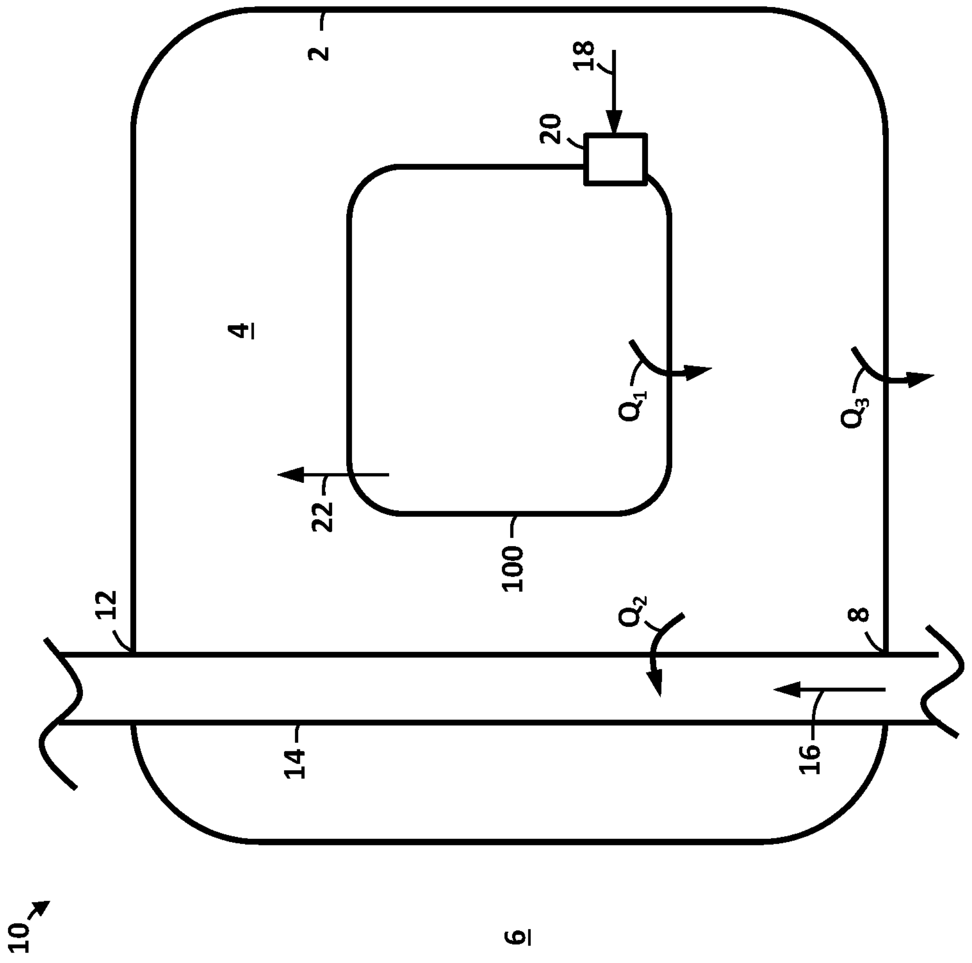
FIG. 1 is a schematic view of an embodiment of a system for heating an enclosure.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms “including” and “comprising” are used in an open-ended fashion, and thus should be interpreted to mean “including, but not limited to . . . .” Also, the term “couple” or “couples” is intended to mean either an indirect or direct connection. Thus, if a first device couples to a second device, that connection may be through a direct connection of the two devices, or through an indirect connection that is established via other devices, components, nodes, and connections. In addition, as used herein, the terms “axial” and “axially” generally mean along or parallel to a given axis (e.g., central axis of a body or a port), the terms “radial” and “radially” generally mean perpendicular to the given axis, and the terms “lateral” and “laterally” generally mean to the side of the given axis (e.g., to the left or right of the given axis). For instance, an axial distance refers to a distance measured along or parallel to the axis, and a radial distance means a distance measured perpendicular to the axis.

As previously described above, enclosure heaters may be used to heat a volume of fluid within a container or housing. In some petrochemical gas sampling systems, it may be desirable to maintain a stream of a sampled gas at or above a particular temperature such as the dewpoint of the sampled gas. However, in some jurisdictions, regulations limit the maximum allowable surface temperatures of hardware in enclosure heaters. Accordingly, embodiments described herein are directed to enclosure heaters that offer the potential to maintain surface temperatures below a particular set point, while maximizing the rate of heat transfer to the local environment and enclosure.

Referring now to FIG. 1, an embodiment of a system 10 for heating an enclosure 2 is shown. Enclosure 2 is a housing or container defining an inner chamber or volume 4 disposed within enclosure 2 and an outer volume 6 outside and external to enclosure 2. A fluid conduit 14 extends through ports 8, 12 in enclosure 2 and traverses inner chamber 4. As will be described in more detail below, in this embodiment, a sample fluid 16 to be heated within enclosure 2 flows periodically or continuously through conduit 14. System 10 also includes a heating unit 100 positioned within inner chamber 4 of enclosure 2. In general, heating unit 100 heats the fluid (e.g., air) within chamber 4, which in turn heats conduit 14 traversing chamber 4 and sample fluid 16 flowing through conduit 14.

Referring still to FIG. 1, in this embodiment, heating unit 100 includes an inlet 18, a choke 20 disposed along inlet 18, and an outlet 22. Inlet 18 is a conduit that supplies air or another working fluid to heating unit 100. As will be described in more detail below, a working fluid (e.g., air) flows through inlet 18 and choke 20 into heating unit 100, then flows through heating unit 100 to outlet 22, and then flows through outlet 22 and exits heating unit 100. In some embodiments, inlet 18 supplies the working fluid from within inner volume 4, whereas in other embodiments, inlet 18 supplies the working fluid from a source external enclosure 2 such as, for example, compressed air. Similarly, in some embodiments, outlet 22 exhausts the working fluid into chamber 4, whereas in other embodiments, outlet 22 exhausts the working fluid external to enclosure 2 such as, for example, into outer volume 6.

During operations, heating unit 100 supplies thermal energy into system 10 to increases the temperature of inner chamber 4, conduit 14 extending through chamber 4, and sample fluid 16 flowing through conduit 14. More particularly, heating unit 100 supplies a first heat transfer $Q_1$ into inner volume 4, thereby heating conduit 14 contained therein. As conduit 14 increases in temperature, a second heat transfer $Q_2$ transfers thermal energy from conduit 14 to heat sample fluid 16 flowing through conduit 14. Some thermal energy may be transferred across enclosure 2 as a third heat transfer $Q_3$, and thus, in some embodiments, insulation may be added to the outside of enclosure 2 to reduce and minimize the third heat transfer $Q_3$.

Figure 2:
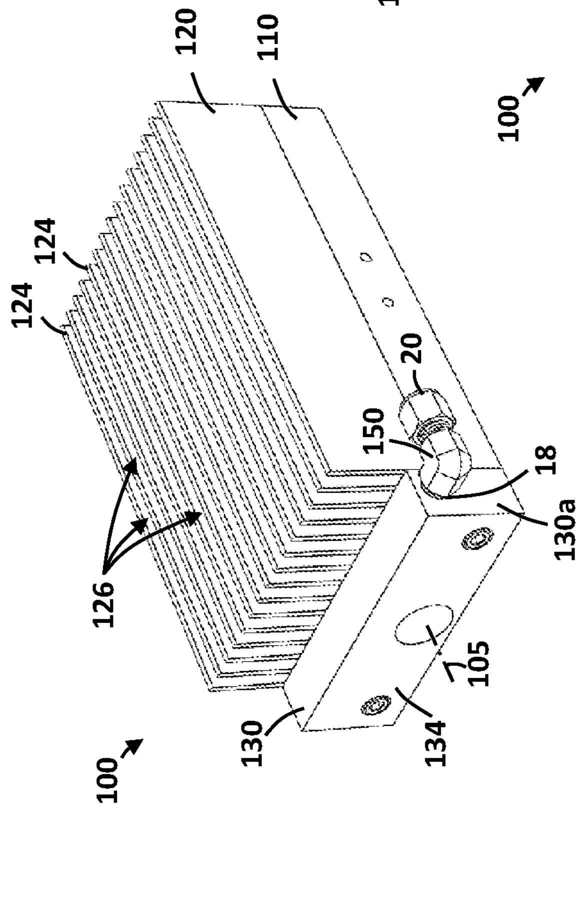
FIG. 2 is an isometric view of the heating unit of FIG. 1.
Figure 3:
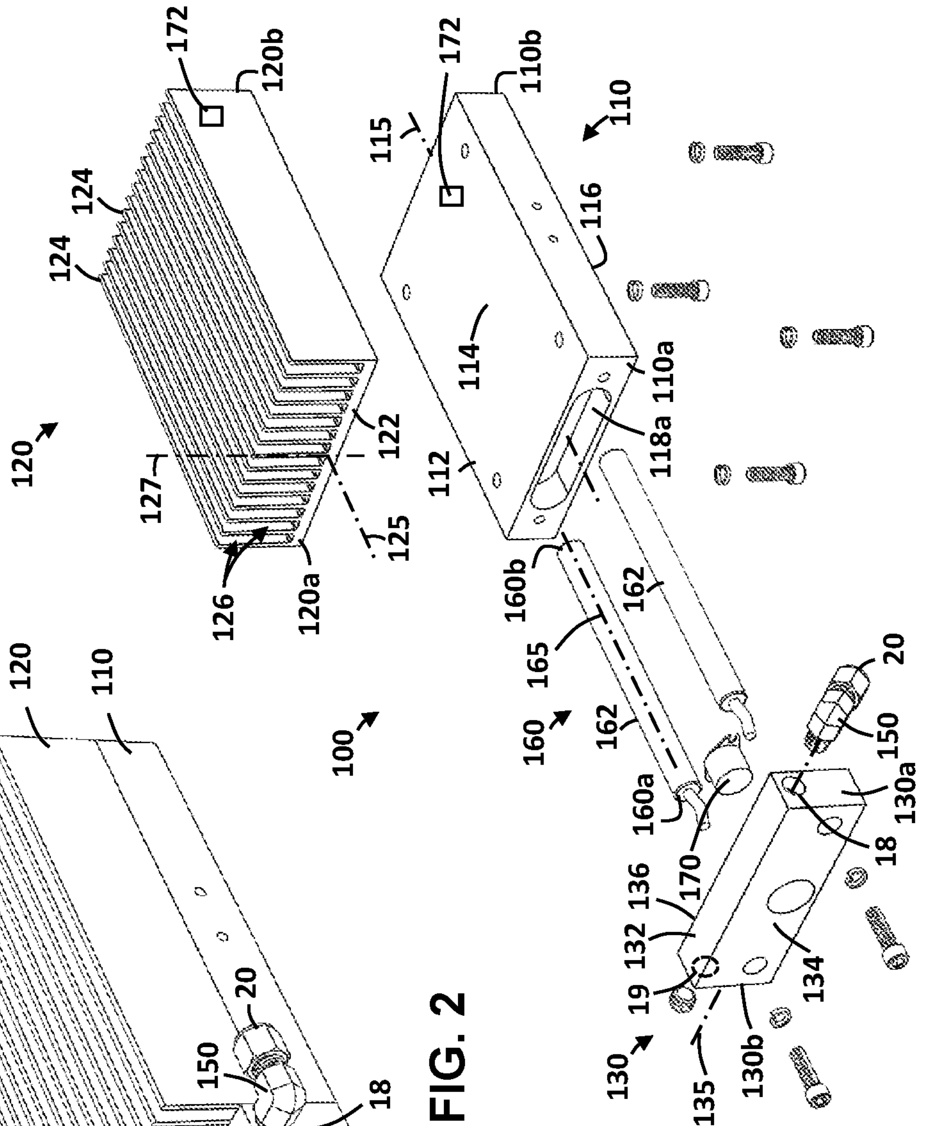
FIG. 3 is an exploded isometric view of the heating unit of FIG. 2.

Referring now to FIGS. 2 and 3, heating unit 100 has a central or longitudinal axis 105 and includes a main body or base 110, a heat sink 120 coupled to base 110, a manifold 130 coupled to base 110, a fitting 150 coupled to manifold 130, a plurality of heating elements or heaters 160 removably disposed in body 110, and a temperature sensor 170 coupled to heaters 160 within body 110. In embodiments described herein, heaters 160 are positive temperature coefficient (PTC) heaters, and thus, may also be referred to as PTC heaters 160. However, in other embodiments, one or more of the heaters (e.g., heaters 160) can be other types of heaters such as resistive heaters, capacitive heaters, dielectric heaters, inductive heaters, etc.

Figure 4:
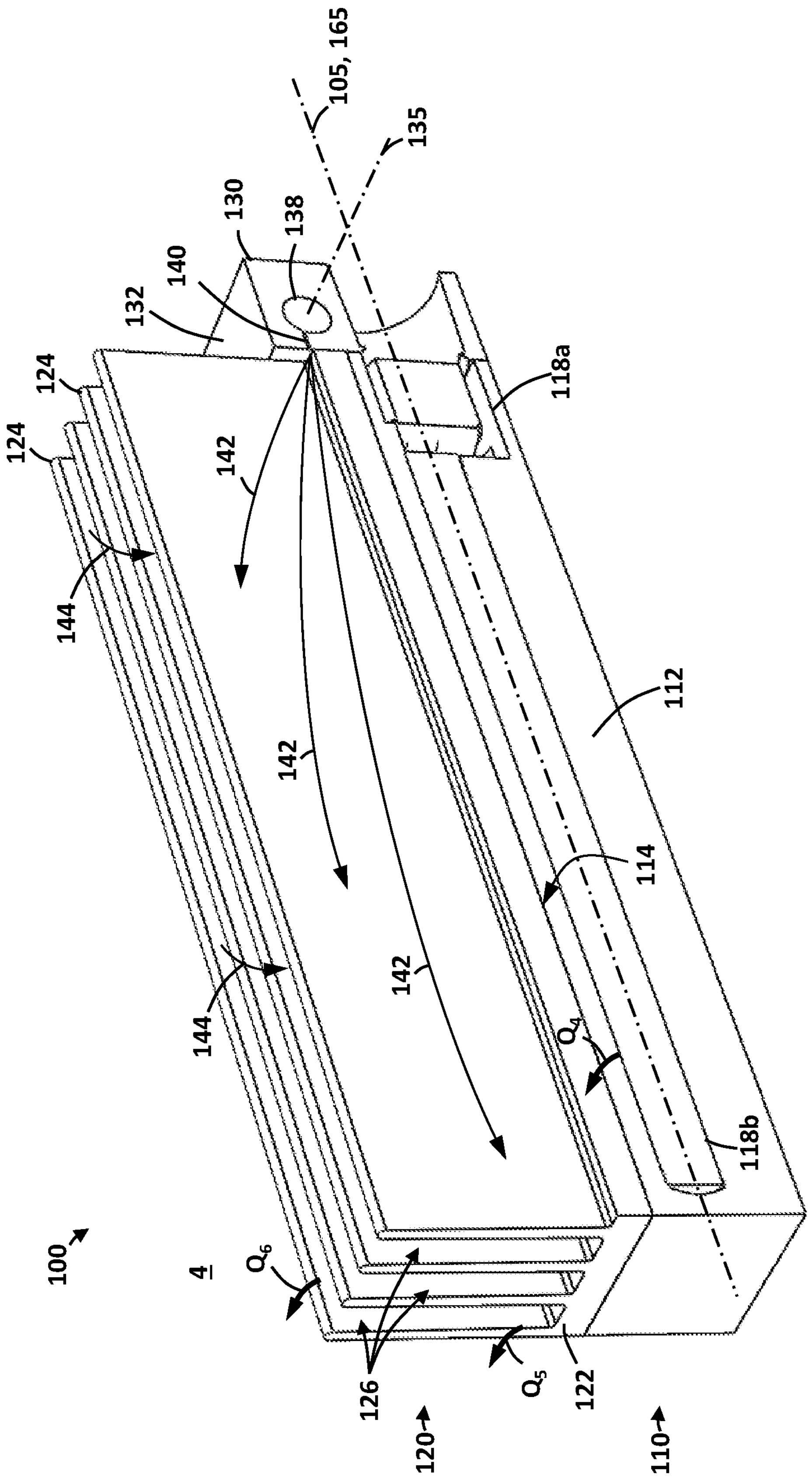
FIG. 4 is an isometric cross-sectional view of the heating unit of FIG. 2.

Referring now to FIGS. 2-4, base 110 has a central or longitudinal axis 115 oriented parallel to axis 105, a first or open end 110*a*, a second or closed end 110*b* axially opposite first end 110*a*, and a rectangular prismatic body 112 extending axially between ends 110*a*, 110*b*. Body 112 has a first or upper planar surface 114 extending axially from end 110*a* to end 110*b*, and a second or lower planar surface 116 extending axially from end 110*a* to end 110*b*. Surfaces 114, 116 are oriented parallel to each other. In addition, base 110 includes a recess 118*a* extending axially from first end 110*a* into body 112 and a plurality of parallel pockets or cavities 118*b* extending axially from recess 118*a* toward second end 110*b*. It should be appreciated that neither recess 118*a* nor cavities 118*b* extend to or through second end 110*b*. Thus, recess 118*a* defines an opening in end 110*a*, however, there is no opening in end 110*b* (i.e., end 110*b* is closed). In this embodiment, recess 118*a* has a generally rectangular cross-section with semi-cylindrical rounded ends in a plane oriented perpendicular to axis 115, and each cavity 118*b* is an elongate cylindrical bore extending axially from recess 118*a*. In this embodiment, cavities 118*b* are laterally spaced apart and positioned with their central axes oriented in a common horizontal plane. As will be described in more detail below, in other embodiments, one or more cavities (e.g., cavities 118*b*) may have different geometries to accommodate heaters with different geometries.

Referring now to FIGS. 2 and 3, heat sink 120 has a central or longitudinal axis 125 oriented parallel to axes 105, 115, a first end 120*a* proximal first end 110*a* of base 110, and a second end 120*b* axially opposite first end 120*a* and proximal end 110*b* of base 110. In addition, heat sink 120 includes a base plate 122 extending axially between ends 120*a*, 120*b*, and a plurality of laterally spaced (relative to axis 125) elongate, parallel heat fins 124 extending from base plate 122. Due to the lateral spacing of parallel heat fins 124, a plurality of laterally spaced (relative to axis 125) channels 126 are defined between heat fins 124. Namely, one channel 126 is laterally positioned between each pair of laterally adjacent fins 124. Fins 124 and channels 126 extend axially from end 120*a* to end 120*b*, and extend perpendicularly from base plate 122. Each fin 124 has the same geometry and extends from the same side of base plate 122. In this embodiment, fins 124 are uniformly laterally spaced relative to central axis 125 and extend from base plate 122 parallel to a second axis 127 oriented perpendicular to axis 125, base plate 122, and surface 114.

Manifold 130 has a central or longitudinal axis 135 disposed in a plane oriented perpendicular to axes 105, 115, 125, a first end 130*a*, a second end 130*b* axially opposite first end 130*a*, and a body 132 extending axially between ends 130*a*, 130*b*. In this embodiment, body 132 of manifold 130 has a rectangular prismatic geometry with a first planar face or surface 134 extending axially between ends 130*a*, 130*b* and a second planar face or surface 136 extending axially between ends 130*a*, 130*b*. Surfaces 134, 136 are oriented parallel to each other, parallel to axis 135, and perpendicular to axes 105, 115, 125.

As best shown in FIG. 4, manifold 130 include a primary flow passage 138 extending axially from first end 130*a* to second end 130*b*, thereby defining openings in both ends 130*a*, 130*b*. The opening in first end 130*a* formed by passage 138 defines inlet 18 in first end 130*a* of manifold 130, and the opening formed by passage 138 in second end 130*b* defines an inlet 19 in second end 130*b* (FIG. 3). Thus, in this embodiment, passage 138 extends through both ends 130*a*, 130*b*; however, in other embodiments, passage 138 may only extend through one end of the manifold (e.g., end 130*a* or end 130*b* of manifold 130). As will described in more detail below, in this embodiment, inlet 18 is open and used to supply fluid into manifold 130, whereas inlet 19 is plugged and is not used to supply fluid into manifold 130. However, in general, inlet 18, inlet 19, or both inlets 18, 19 can be used to supply fluid into manifold 130.

For most sample gas heating applications, main passage 138 has a diameter ranging from about 0.125 in. to about 0.50 in., alternatively from about 0.25 in. to about 0.50 in., and alternately from about 0.375 in. to about 0.50 in. A plurality of orifices 140 extend from passage 138 to surface 136. In particular, orifices 140 are uniformly axially spaced relative to axis 135, and extend laterally and radially (relative to axis 135) from passage 138 to surface 136. Thus, orifices 140 are generally disposed in a plane oriented perpendicular to surface 136 and parallel to axes 115, 125, 135. In this embodiment, the axial spacing of orifices 140 is the same as the lateral spacing of channels 126 of heat sink 120 such that an outlet of each orifice 140 at surface 136 is aligned with one of the channels 126 positioned between each pair of laterally adjacent fins 124 when manifold 130 and heat sink 120 are mounted to base 110. As will be described in more detail below, a working fluid flows through choke 20 into inlet 18, through inlet 18 into passage 138, and then from passage 138 through orifices 140 and exits orifices 140 at surface 136 into channels 126 between fins 124. For most sample gas heating applications, each orifice 140 has a diameter ranging from about 0.003 in. to about 0.075 in., alternatively from about 0.010 in. to about 0.050 in., and alternately from about 0.020 in. to about 0.040 in.

As best shown in FIGS. 2 and 3, a fitting 150 is coupled to body 132 at end 130*a* and is in fluid communication with inlet 18 and passage 138. Thus, fitting 150 flows the working fluid into passage 138 via inlet 18. In this embodiment, choke 20, which may be used to control flow of working fluid into manifold 130, is disposed in fitting 150. In some embodiments, choke 20 is selectably adjustable between a fully open position and a partially closed position, while other embodiments include a non-adjustable internal orifice (not shown). In other embodiments, fitting 150 may be coupled to body 132 along end 130*b* in fluid communication with open inlet 19 (while inlet 18 is plugged), or a fitting 150 may be coupled to each open inlet 18, 19 (with neither inlet 18, 19 plugged).

Referring now to FIG. 3, each heater 160 has a central or longitudinal axis 165 oriented parallel to axes 105, 115, a first end 160*a*, a second end 160*b* axially opposite first end 160*a*, and an elongate cylindrical body 162 extending axially from first end 160*a* to second end 160*b*. In this embodiment, heating unit 100 includes two PTC heaters 160, however, in general, any suitable number of heaters 160 may be used depending on the heat output requirements of heating unit 100.

As previously described, in this embodiment, each heater 160 is a positive temperature coefficient (PTC) heater. The use of PTC heaters for heaters 160 may be particularly advantageous in embodiments described herein as no feedback temperature control system may be required to ensure heaters 160 remain below a predetermined set temperature. While not specifically required, in this embodiment, heating unit 100 includes a temperature sensor 170. In general, temperature sensor 170 can be any device or sensor that measures and communicates temperature including, without limitation, a resistance temperature detector (RTD) or thermocouple. Temperature sensor 170 may be used to alarm a user when heating unit 100 falls below a particular predetermined temperature (e.g., in the event that PTC heaters 160 fail to operate as intended) to provide temperature feedback for a control system (not specifically shown) that monitors the heaters (e.g., heaters 160), function as an over temperature switch that may disconnect the heaters if the temperatures rises above a predetermined set point temperature, detect failure of the heater(s), or combinations thereof.

As described above, each heater 160 is a PTC heater. In general, PTC heaters are made of a positive temperature coefficient material (PTC material), which has a resistance that increases with a rising operating temperature. The PTC material can be selected to have a sharp increase in resistance at a particular "Curie temperature" or "set point temperature" such that PTC heater 160 will reach but not exceed the Curie temperature when exposed to a constant voltage. For regulatory purposes, in some embodiments, a maximum permissible temperature along outer surfaces of heating unit 100 may be dictated and required. In such embodiments, a self-temperature regulating PTC heater 160 using a PTC type material offers the potential for a fail-safe system that reliably maintains heating unit 100 below the maximum temperature. For an added level of security, temperature sensor 170 may also be used to further ensure that the outer surfaces of heating unit 100 are maintained below the maximum temperature setting.

As previously described, in other embodiments, heaters 160 may be other types of heaters (other than PTC heaters) such as resistive heaters, capacitive heaters, dielectric heaters, inductive heaters, etc. In such embodiments, a temperate feedback control may be used to regulate the set point temperature. More particularly, a signal from temperature sensor 170 may be used by a control system to selectively apply power to heaters 160 to maintain the set point temperature. Alternatively, or in addition, thermocouples 172 may be placed on any portion of heating unit 100 to provide temperature feedback, which may be used to regulate heaters 160 (e.g., to maintain a desired temperature of heating unit 100, limit the maximum temperature of heating unit 100, etc.). Additional thermocouples, which are not used for heater 160 control, may also be placed on any portion of heating unit 100 for monitoring purposes and or as part of addition safety systems, which may be required for example by particular regulations.

Referring again to FIGS. 2 and 3, to assemble heating unit 100, PTC heaters 160 are axially advanced through recess 118*a* and into corresponding cavities 118*b*, base plate 122 of heat sink 120 is fixably attached to body 112 of base 110, and body 132 of manifold 130 is fixably attached to body 112 of base 110. In particular, the planar surface of base plate 122 directly engages and is compressed against surface 114 of body 112 to promote efficient conductive heat transfer therebetween, and surface 136 of body 132 directly engages and is compressed against end 110*a* of base 110. In this embodiment, bolts may be used to attach and compress bodies 112, 132, and base plate 122. Heaters 160 are positioned within cavities 118*b* of base 110 via close sliding fit to promote efficient conductive heat transfer between PTC heaters 160 and base 110. In some embodiments, a press fit is may be used, with or without a thermally conductive paste. When heater unit 100 is assembled, fins 124 are disposed on the side of base plate 122 opposite base 110 and extending outward and away from body 112 and base plate 122. With manifold 130 attached to end 110*a* of base 110, recess 118*a* and cavities 118*b* are closed off at end 110*a* and PTC heaters 160 are captured within corresponding cavities 118*b*. Fitting 150 is coupled to end 130*a* of manifold 130 in fluid communication with inlet 18. The outlet ends of orifices 140 along surface 136 are positioned above body 112 and base plate 122 with each outlet end being aligned and in fluid communication with one of the channels 126 positioned between each pair of the laterally adjacent fins 124.

Referring now to FIGS. 1 and 4, as previously described, during heating operations, heating unit 100 transfers thermal energy into system 10, thereby increases the temperature of inner volume 4, conduit 14, and sample fluid 16 within conduit 14. More particularly, heating unit 100 supplies a first heat transfer $Q_1$ into inner volume 4, thereby heating conduit 14 extending therethrough. As conduit 14 increases in temperature, a second heat transfer $Q_2$ transfers thermal energy through conduit 14 to sample fluid 16, thereby heating sample fluid 16 disposed therein. A third heat transfer $Q_3$, may transfer thermal energy across enclosure 2 from inner volume 4 to outer volume 6. As previously described, thermally insulating layers (not shown) may be provided on the outside enclosure 2 to minimize third heat transfer $Q_3$ such that a larger percentage of thermal energy from heating unit 100 is transferred into sample fluid 16. Thermal energy may also be further transferred via inlet 18 and outlet 22. For example, a heated working fluid supplied via inlet 18 may deliver additional thermal energy into heating unit 100, which may be delivered into inner volume 4 directly via mass transfer as the working fluid fills inner volume 4, or without the working fluid filling inner volume 4. In addition, outlet 22 may transfer thermal energy away from system 10 and into outer volume 6, for example in embodiments where outlet 22 physically passes through enclosure 2.

As used herein, the term "heat transfer" and the term "thermal energy transfer" (e.g., first heat transfer $Q_1$) may include conductive heat transfer, convective heat transfer, radiative heat transfer, and combinations thereof. Unless otherwise specified, the total heat transfer at each location discussed herein may be increased or decreased by increasing or decreasing one or more of the conduction, convection, and radiation heat transfer components of the total heat transfer. For example, heating unit 100 may be placed in abutting contact with conduit 14 to increase the conductive heat transfer therebetween, thereby increasing first heat transfer $Q_1$ and second heat transfer $Q_2$. Additionally, the materials and/or surface finishes of the components of heating unit 100 (e.g., fins 124, base 110, etc.) can be selected to increase or decrease the emissivity coefficient, and thus, increase or decrease the radiation heat transfer component of the total heat transfer. Further, the convective heat transfer component of the total heat transfer may be increased or decreased, for example, by flowing higher velocity working fluids across heating unit 100, by increasing or decreasing surface areas, and by varying the spacing between components, such as fins 124 of heat sink 120. For example, in an embodiment with a decreased fin 124 spacing along heat sink 120, a greater number of fins will be used for a given sized heat sink 120, and thus heat sink 120 will present a larger overall surface area, which may in some embodiments tend to increase the convective heat transfer. However, with less space between fins 124, less flow area is available to accommodate the working fluid flow. In some embodiments, a reduced flow area between fins 124 may result in higher working fluid flow velocities through orifices 140, which again may tend to increase the convective heat transfer component of first heat transfer $Q_1$. However, in some other embodiments, a reduced flow area between fins 124 may result in a decreased working fluid flow velocity, due to pressure losses between inlet 18 and outlet 22, and thus may reduce the convective heat transfer component of first heat transfer $Q_1$.

Referring to FIG. 4, the conductive heat transfer component of a fourth heat transfer $Q_4$ relies on contact between body 112 of base 110 and PTC heater 160 (heater 160 not shown in FIG. 4), and relies on a temperature gradient between PTC heater 160 and first surface 114 to transfer thermal energy across body 112 to heat sink 120. Therefore, body 162 of PTC heater 160 will be maintained at a higher temperature than the maximum temperature along outer surfaces of heating unit 100. Maximizing the rate of fourth heat transfer $Q_4$, allows a maximum rate for second heat transfer $Q_2$ into sample 16, however, maximizing the rate of fourth heat transfer $Q_4$, may be limited by the maximum temperature allowed along outer surfaces of heating unit 100 (e.g., as required by particular regulations). Therefore, in embodiments described herein, a fifth heat transfer $Q_5$ and a sixth heat transfer $Q_6$ are maximized using convection, so that the rate of fourth heat transfer $Q_4$ can be maximized, while also satisfying the maximum temperature allowed along outer surfaces of heating unit 100. More specifically, during operations, a pressurized working fluid is supplied to main passage 138 via inlet 18. The flow rate of the working fluid into and through main passage 138 is controlled and limited by choke 20 (FIG. 3) and the number and diameters of orifices 140. The working fluid flows through main passage 138 and into the orifices 140, which emit the working fluid into channels 126 as represented by arrows 142 in FIG. 4. The flow 142 of the working fluid within channels 126 generally moves axially (relative to axes 105, 125) along the length of the channels 126. Flow 142 in the axial direction in channels 126 between fins 124 may induce lower pressure regions within channels 126, which in turn may draw fluid in chamber 4 surrounding heating unit 100 (e.g., air flow) into channels 126 as represented by arrows 144 in FIG. 4. In general, the flow 142 of working fluid into channels 126, along with the flow 144 into channels 126, offers the potential to increase the convective heat transfer associated with fifth heat transfer $Q_5$ and sixth heat transfer $Q_6$, thereby enhancing the transfer of thermal energy from heating unit 100 to conduit 14 and the sample fluid 16 therein, while maintaining the surface temperature of heating unit 100 relatively low (e.g., below the maximum permissible surface temperature).

As previously described, PTC heaters 160 transfer thermal energy to base 110 via conduction, base 110 transfer thermal energy to heat sink 120 via conduction, and thermal energy moves through heat sink 120 from base plate 122 into and through fins 124 via conduction. To enhance conductive heat transfer through and between base 110 and heat sink 120, base 110 and heat sink 120 are made of thermally conductive materials such as metals and metal alloys. For example, in some embodiments, base 110 and heat sink 120 are made of aluminum.

Figure 5:
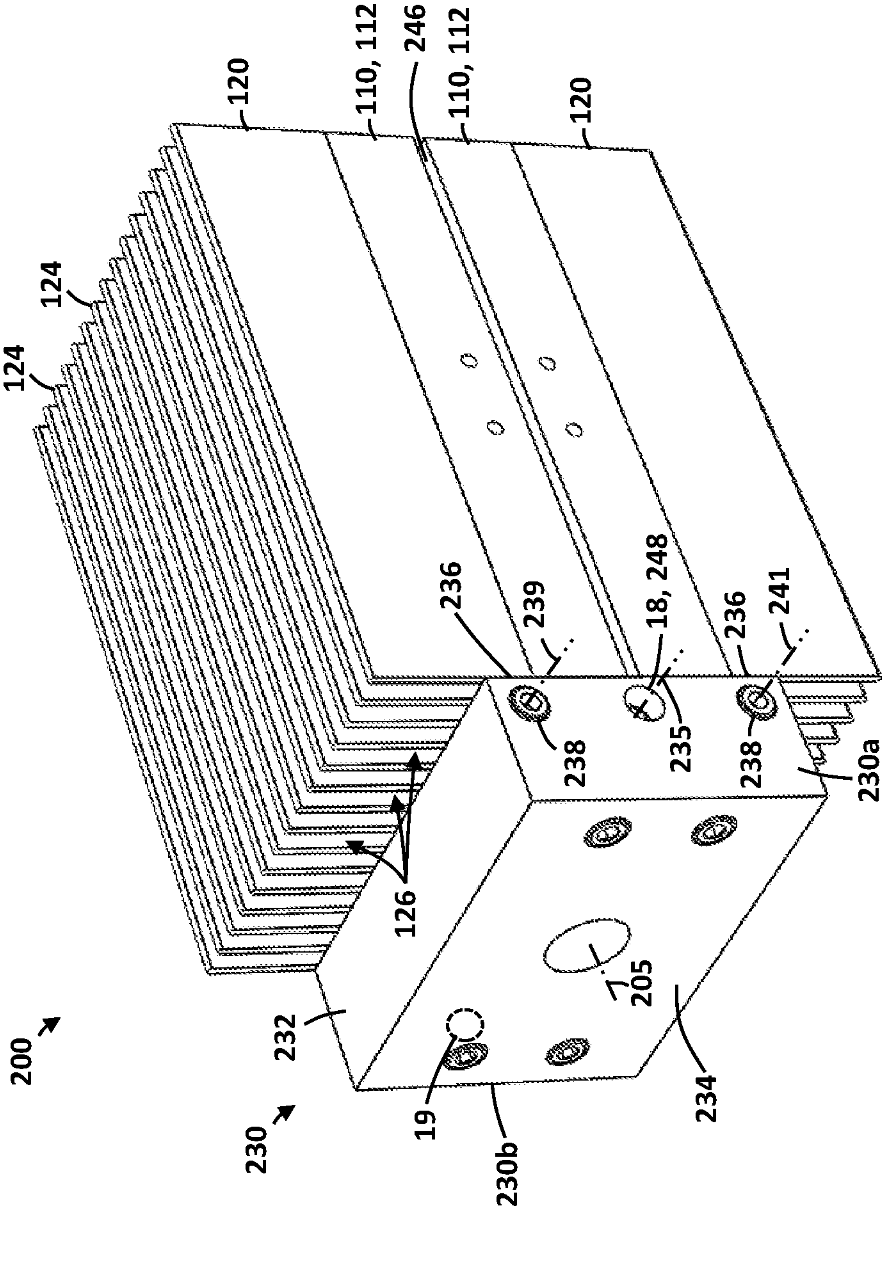
FIG. 5 is an isometric view of an embodiment of a heating unit in accordance with principles described herein.
Figure 6:
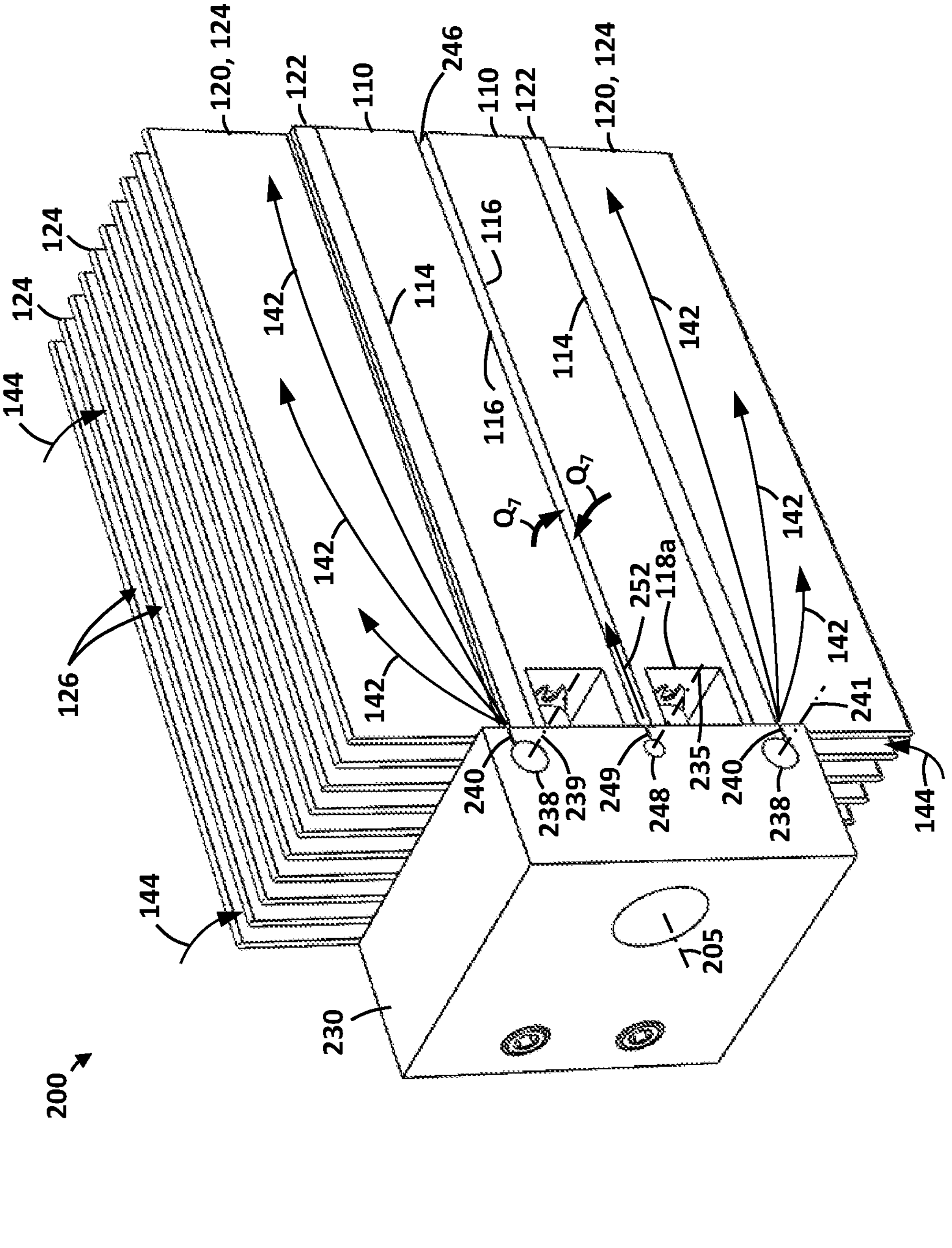
FIG. 6 is an isometric cross-sectional view of the heating unit of FIG. 5.

Referring now to FIGS. 5 and 6, an embodiment of heating unit 200 is shown. In general, heating unit 200 can be used within system 10 in place of heating unit 100 previously described. Heating unit 200 is similar to heating unit 100 previously described, and thus, components of heating unit 200 that are the same as those in heating unit 100 are identified with like reference numerals, and the description below will focus on features that are different.

In this embodiment, heating unit 200 has a central or longitudinal axis 205 and includes a plurality of bases 110 coupled together, a plurality of heat sinks 120 coupled to bases 110, a manifold 230 coupled to bases 110, and a plurality of PCT heaters 160 disposed in each base 110. Bases 110 and heat sinks 120 are each as previously described with respect to heating unit 100. Manifold 230 has a central or longitudinal axis 235, a first end 230*a*, a second end 230*b* axially opposite first end 230*a*, and a body 232 extending axially between ends 230*a*, 230*b*. In this embodiment, body 232 has a rectangular prismatic shape including a first planar face or surface 234 and a second planar face or surface 236 opposite first surface 234. Surfaces 234, 236 extend axially between ends 230*a*, 230*b*. Inlets 18, 19 as previously described are provided at ends 230*a*, 230*b*, respectively. In this embodiment, inlet 18 is open and used to supply fluid into manifold 230, whereas inlet 19 is plugged and is not used to supply fluid into manifold 230. However, as previously described, in general, inlet 18, inlet 19, or both inlets 18, 19 can be used to supply fluid into manifold 130.

As best shown in FIG. 6, a pair of radially spaced main passages 238 extend axially (relative to axis 235) through body 232 from first end 230*a* to second end 230*b*. In this embodiment, inlet 18 is positioned between passages 238. Each passage 238 has a central axis 239, 241, respectively, oriented parallel to axis 235. A gas passage 248 also extends axially (relative to axis 235) through body 232 from first end 230*a* to second end 230*b*. Passage 248 is positioned between main passages 238, is oriented parallel to main passages 238, and defines inlets 18, 19 at ends 230*a*, 230*b*, respectively. In this embodiment, passage 248 has a smaller diameter than inlets 18, 19 and passages 238. Main passages 238 and passage 248 are in fluid communication with each other via a cross drilled passages extending from passage 248 to each passage 238.

A plurality of gap orifices 249 extend from passage 248 to face 236, and a plurality of orifices 240 extend from each passage 238 to face 236. Gap orifices 249 are uniformly axially spaced relative to axes 235, 239, 241, and extend radially and laterally relative to axis 235 from passage 248 to face 236. Orifices 240 are uniformly axially spaced relative to axes 235, 239, 241, and extend radially and laterally relative to axis 239, 240 of the corresponding passage 238 to face 236. In this embodiment, orifices 249 generally lie in a plane oriented perpendicular to surface 236 and parallel to axes 205, 215, and orifices 240 extending from the same passage 238 generally lie in a plane oriented perpendicular to surface 236 and parallel to axes 205, 215. In this embodiment, the axial spacing of orifices 240 is the same as the lateral spacing of channels 126 and fins 124 of the corresponding heat sink 120 such that an outlet of each orifice 240 along surface 236 is aligned with one channel 126 positioned between a pair of laterally adjacent fins 124 of the corresponding heat sink 120 when manifold 230 and heat sinks 220 are mounted to bases 110. As will be described in more detail below, a working fluid flows into inlet 18 into and through passages 248, 238, and then flows from passages 248, 238 through orifices 249, 240, respectively, and exits orifices 249, 240 at surface 236.

For most sample gas heating applications, each main passage 238 has a diameter ranging from about 0.125 in. to about 0.50 in., alternatively from about 0.25 in. to about 0.50 in., and alternately from about 0.375 in. to about 0.50 in.; and passage 248 has a diameter ranging from about 0.062 in. to about 0.25 in., alternatively from about 0.125 in. to about 0.25 in., and alternately from about 0.188 in. to about 0.25 in. For most sample gas heating applications, each orifice 240 has a diameter ranging from about 0.003 in. to about 0.075 in., alternatively from about 0.010 in. to about 0.050 in., and alternately from about 0.020 in. to about 0.040 in.; and each orifice 249 has a diameter ranging from about 0.003 in. to about 0.075 in., alternatively from about 0.010 in. to about 0.050 in., and alternately from about 0.020 in. to about 0.040 in.

Referring again to FIGS. 5 and 6, to assemble heating unit 200, PTC heaters 160 are positioned within corresponding cavities 118*b* of each base 110, base plate 122 of each heat sink 120 is fixably attached to body 112 of one base 110, and body 232 of manifold 230 is fixably attached to both bodies 112 of bases 110 at ends 110*a*. In this embodiment, bolts may be used to attach and compress body 232 with both bodies 112, and to compress each body 112 with the corresponding base plate 122. The bases 110 are positioned radially adjacent to each other (relative to axes 115) with surfaces 116 facing each other and oriented parallel to each other with a gap 246 disposed therebetween. Base plates 122 engage surfaces 114 of bodies 112, and thus, fins 124 generally extend from bases 110 away from each other. Manifold 230 is attached to bases 110 with surface 246 engaging ends 110*a*, thereby closing recesses 118*a* and cavities 118*b* at ends 110*a* and capturing PTC heaters 160 within cavities 118*b*. Fitting 150 is coupled to end 230*a* of manifold 230 in fluid communication with inlet 18. Bodies 112 and base plates 122 are positioned between the two rows of the outlet ends of orifices 240 along surface 236 with each outlet end aligned with one channel 126 positioned between each pair of the laterally adjacent fins 124 of the corresponding heat sink 120. As best shown in FIG. 6, the outlet ends of orifices 249 along surface 236 are positioned between bodies 112 in alignment with and in fluid communication with corresponding gap 246.

Referring still to FIGS. 5 and 6, heating unit 200 transfers thermal energy into a system (e.g., system 10) in a similar manner as heating unit 100 previously described. In particular, during operations, a pressurized working fluid is supplied to gap passage 248 via inlet 18. The pressurized fluid flows through gap passage 248 and into and through main passages 138, which are in fluid communication with gap passage 248. The flow rate of the working fluid into and through passage 238, 248 is controlled and limited by choke 20, as well as by the number and diameters of orifices 240, 249. The working fluid flows through passages 238, 248 and into the orifices 240, 249, respectively. Orifices 240 emit the working fluid into channels 126 between each pair of laterally adjacent fins 124 of the corresponding heat sink 120 (as represented by flow 142) in the same manner as previously described with respect to heating unit 100. Orifices 249 emit the working fluid into gap 246 between opposed surfaces 116 of bases 110 as represented by flow 252 in FIG. 6. Flow 252 generally progresses axially (relative to axes 205, 215) through gap 246 and results in seventh heat transfer $Q_7$. In the embodiment shown in FIGS. 5 and 6, PTC heaters 160 transfer thermal energy to bases 110 via conduction, bases 110 transfer thermal energy to corresponding heat sinks 120 via conduction, and thermal energy moves through each heat sink 120 from base plate 122 into and through fins 124 via conduction. To enhance conductive heat transfer through and between bases 110 and heat sinks 120, bases 110 and heat sinks 120 are made of thermally conductive materials such as metals and metal alloys.

Figure 7:
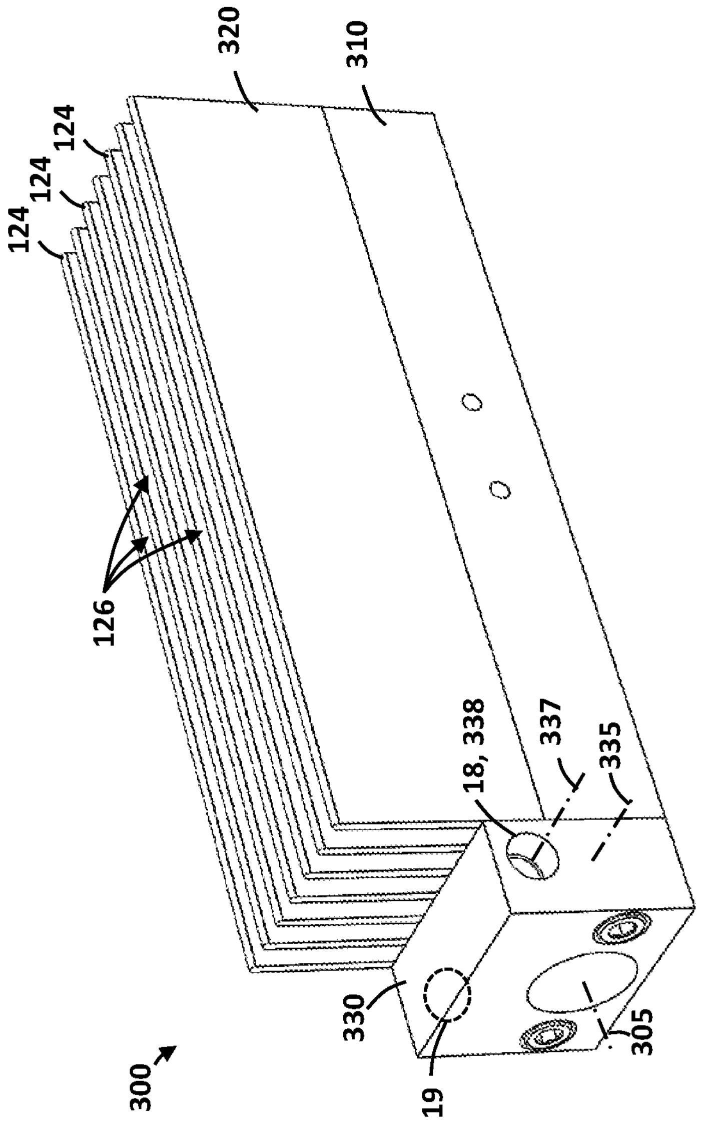
FIG. 7 is an isometric view of an embodiment of a heating unit in accordance with principles described herein.
Figure 8:
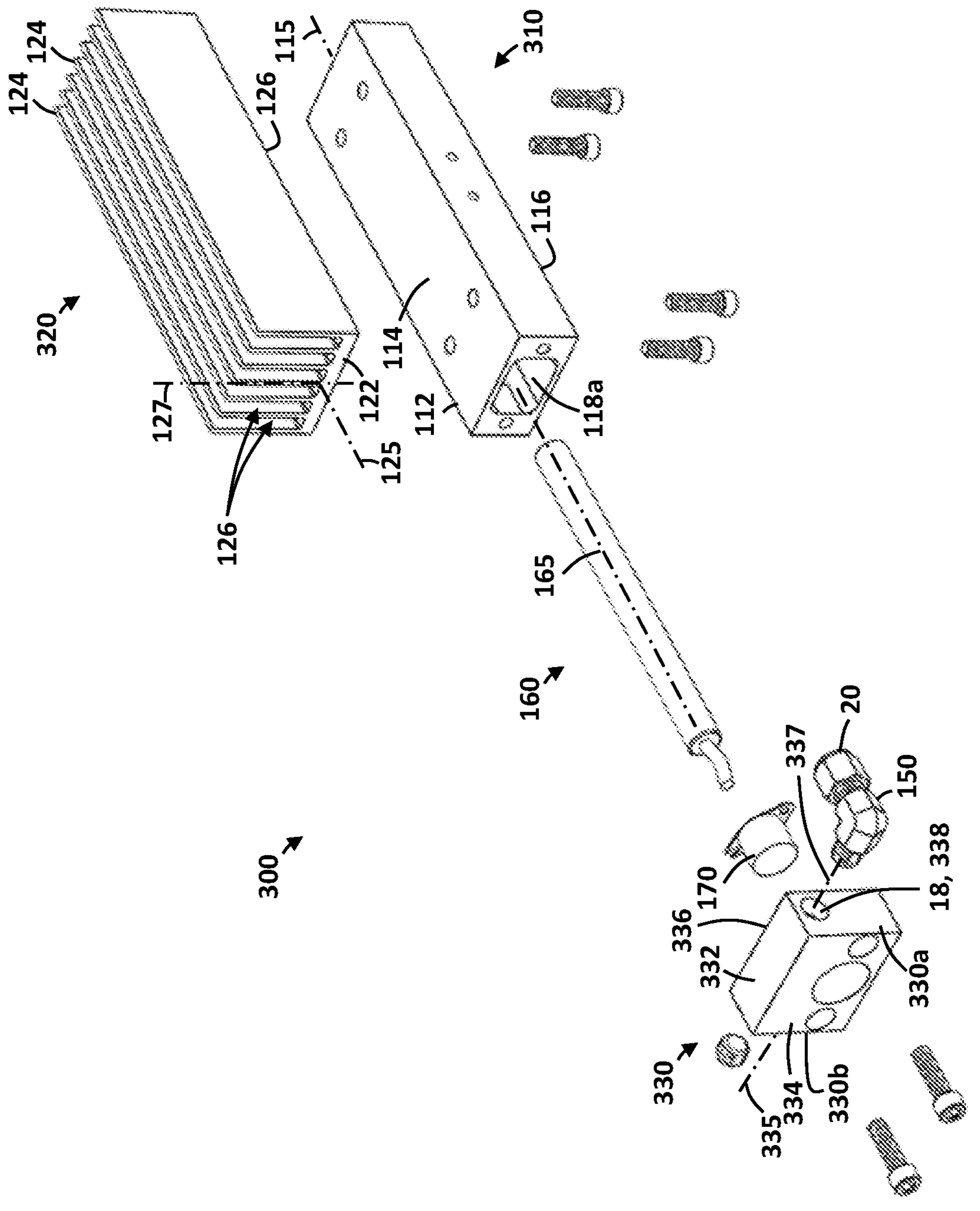
FIG. 8 is an exploded isometric view of the heating unit of FIG. 7.

Referring now to FIGS. 7 and 8, an embodiment of heating unit 300 is shown. In general, heating unit 300 can be used within system 10 in place of heating unit 100 previously described. Heating unit 300 is similar to heating unit 100 previously described, and thus, components of heating unit 300 that are shared the same as those in heating unit 100 are identified with like reference numerals, and the description below will focus on features which are different.

In this embodiment, heating unit 300 has a central or longitudinal axis 305, and includes a base 310, a heat sink 320 coupled to base 310, and a manifold 330 coupled to base 310. Base 310 is the same as base 110 previously described with the exception that base 310 has a width measured perpendicular to axis 115 that is less than the width of base 110, and further, only one cavity 118*b* is provided in base 310 to accommodate one heater 160. In addition, heat sink 320 is the same as heat sink 120 previously described with the exception that heat sink 320 has a width measured perpendicular to axis 125 that is less than the width of heat sink 120, which results in fewer fins 124 on base 310 as compared to base 110. Manifold 330 has a central or longitudinal axis 335, a first end 330*a*, a second end 330*b* axially opposite first end 330*a*, and a body 332 extending axially between ends 330*a*, 330*b*. In this embodiment, body 332 has a rectangular prismatic shape including a first planar face or surface 334 and a second planar face or surface 336 opposite first surface 334. Surfaces 334, 336 extend axially between ends 330*a*, 330*b*. Inlet 18 is disposed at end 330*a* and inlet 19 is disposed at end 330*b*. A main passage 338 extends axially (relative to axis 335) through body 332 from first end 330*a* to second end 330*b*. Passage 338 has a central axis 337 oriented parallel to axis 335 and defines inlets 18, 19 at ends 330*a*, 330*b*, respectively. In this embodiment, inlet 18 is open and used to supply fluid to main passage 338 of manifold 330 while inlet 19 is plugged and is not used to supply fluid into main passage 338. However as previously described, in other embodiments, inlet 18, inlet 19, or both inlets 18, 19 can be used to supply fluid to main passage 338 of manifold 330. A plurality of axially spaced orifices 140 as previously described (not shown) extend radially and laterally from passage 338 to face 336. Inlet 18, passages 338, and orifices 140 direct a pressurized working fluid into channels 126 between fins 124 in the same manner as previously described with respect to heating unit 100.

To assemble heating unit 300, PTC heater 160 is positioned within cavity 118, base plate 122 of heat sink 320 is fixably attached to body 112 of base 310, and body 332 of manifold 330 is fixably attached to body 112 of base 310. In particular, the planar surface of base plate 122 directly engages and is compressed against surface 114 of body 112 to promote efficient conductive heat transfer therebetween, and surface 336 of body 332 directly engages and is compressed against end 110*a*. In this embodiment, bolts may be used to attach and compress body 332 with both bodies 112 and to compress each body 112 with the corresponding base plate 122. PTC heater 160 is advanced through recess 118*a* and into cavity 118*b* of base 310 via close sliding fit to promote efficient conductive heat transfer between PTC heaters 160 and base 110. With manifold 330 attached to end 110*a* of base 310, recess 118*a* and cavity 118*b* are closed off at end 110*a* and PTC heater 160 is captured within cavity 118*b*. Fitting 150 is coupled to end 330*a* of manifold 330 in fluid communication with inlet 18 in this embodiment, however fitting 150 may also be coupled to end 330*b* and inlet 19. The outlet ends of orifices 140 along surface 336 are aligned with channels 126 of the corresponding heat sink 320. Generally speaking, heating unit 300 operates in the same manner previously described for heating unit 100.

Figure 9:
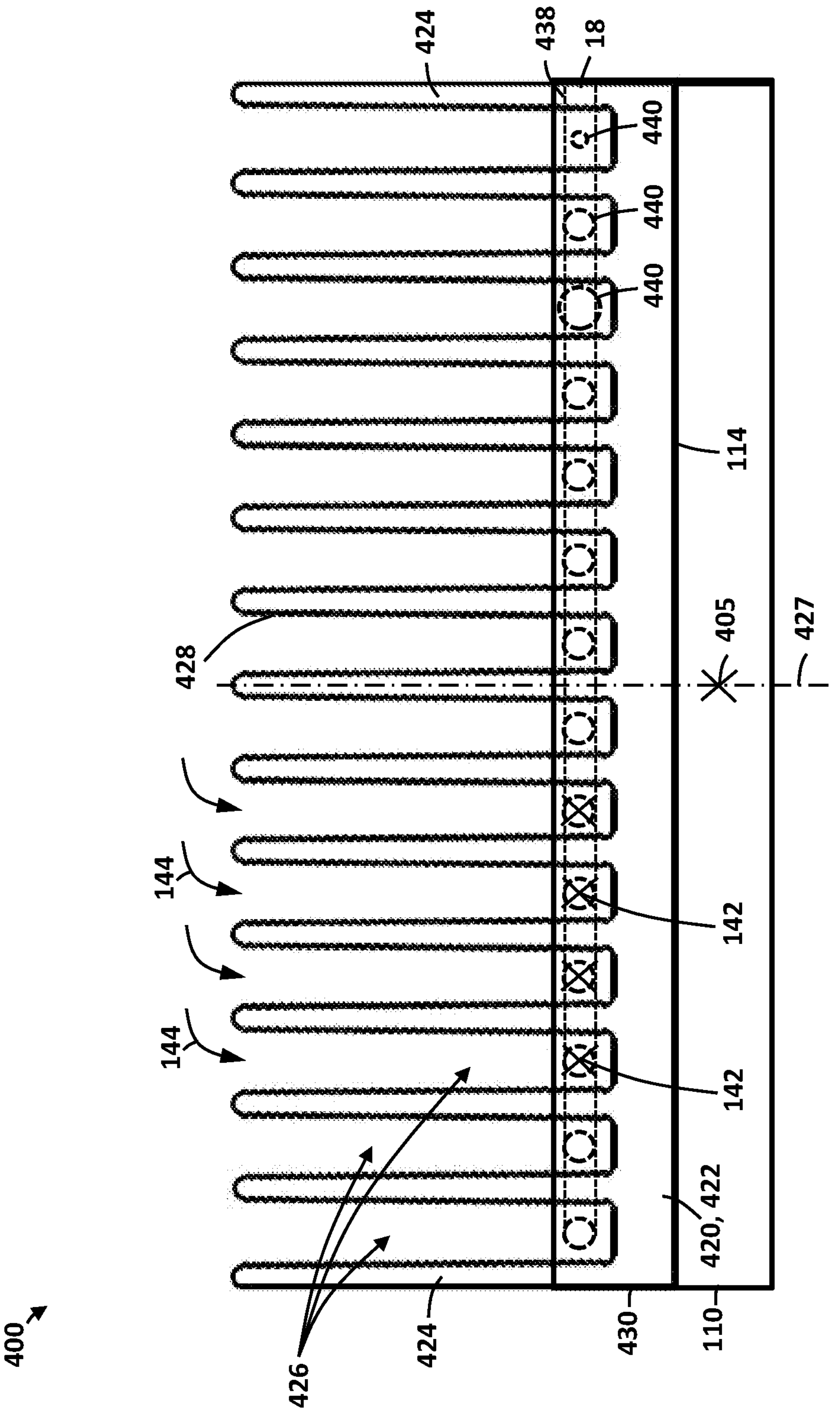
FIG. 9 is a front view of an embodiment of a heating unit in accordance with principles described herein.

Referring now to FIG. 9, an embodiment of heating unit 400 is shown. In general, heating unit 400 can be used within system 10 in place of heating unit 100 previously described. Heating unit 400 is similar to heating unit 100 previously described, and thus, components of heating unit 400 that are the same as those in heating unit 100 are identified with like reference numerals, and the description below will focus on features which are different.

In this embodiment, heating unit 400 has a central axis 405 and includes a base 110 as previously described, a heat sink 420 coupled to base 110, and a manifold 430 coupled to base 110. Heat sink 420 includes a base plate 422 and a plurality of laterally spaced fins 424 extending from base plate 422 parallel to a second axis 427 oriented perpendicular to axis 405 and surface 114. In this embodiment, each fin 424 includes serrations 428, which in some embodiments are formed as a wavy or undulating surface.

Manifold 430 includes a main passage 438 defining inlets 18, 19 and a plurality of laterally spaced orifices 440. In this embodiment, inlet 18 is open and is used to supply fluid to main passage 438 of manifold 430, whereas inlet 19 is plugged and is not used to supply fluid to main passage 438 of manifold 430. However, as previously described, in other embodiments, inlet 18, inlet 19, or both inlets 18, 19 can be used to supply fluid into main passage 438 of manifold 430. Inlet 18, passage 438, and orifices 440 are in fluid communication with each other. In this embodiment, orifices 440 are laterally spaced such that each orifice 440 is aligned with a channel 426 laterally positioned between each pair of laterally adjacent fins 424. During heating operations, flow 142 as previously described passes between each pair of adjacent fins 424 and induced flow 144 as previously described may also occur along the distal free ends of fins 424. The geometry of serrations 428 may be adjusted to control the flow directions of flow 142 and induced flow 144 and to optimize the overall heat transfer from heating unit 400. In addition, the plurality of orifices 440 may include at least one orifice 440 with a different diameter, as the flow rate of flow 142 may be balanced or separately "tuned" between each pair of fins 424.

In the embodiments of heating units 100, 200, 300 previously described, heaters 160 having elongate cylindrical bodies 162 that are seated in mating cavities 118*b* extending axially from corresponding recesses 118*a* in ends 110*a* of bases 110, 310. However, in other embodiments, the heaters (e.g., heaters 160) have geometries other than cylindrical and/or the heaters may be installed in a different manner.

Figure 10:
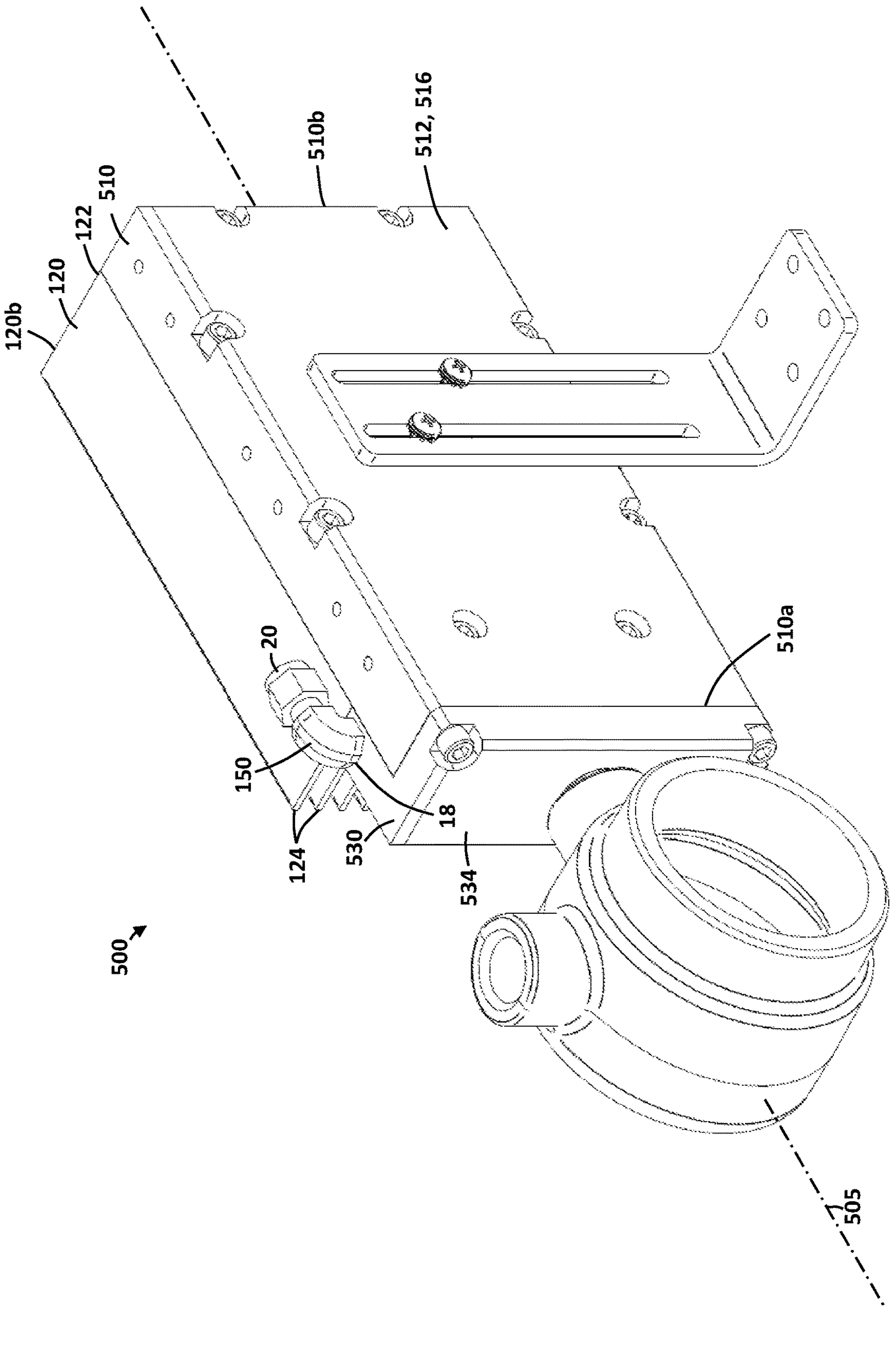
FIG. 10 is an isometric view of an embodiment of a heating unit in accordance with principles described herein.
Figure 11:
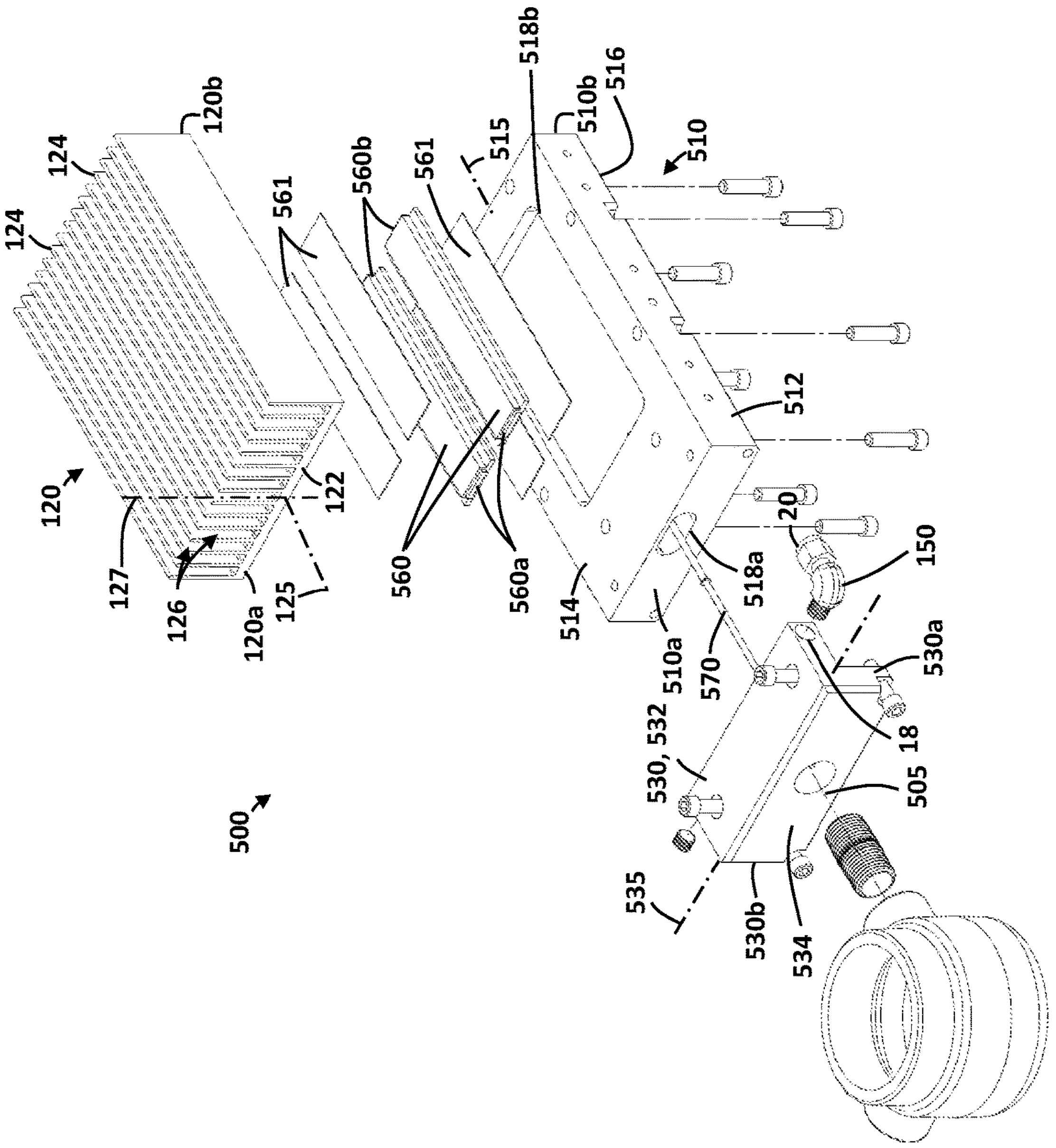
FIG. 11 is an exploded isometric view of the heating unit of FIG. 10.

Referring now to FIGS. 10 and 11, an embodiment of heating unit 500 is shown. In general, heating unit 500 can be used within system 10 in place of heating unit 100 previously described. Heating unit 500 is similar to heating unit 100 previously described, and thus, components of heating unit 500 that are the same as those in heating unit 100 are identified with like reference numerals, and the description below will focus on features that are different.

In this embodiment, heating unit 500 has a central or longitudinal axis 505 and includes a base 510, a heat sink 120 coupled to base 510, a manifold 530 coupled to base 310, a fitting 150 coupled to manifold 530, and a plurality of PCT heaters 560 disposed in base 510. Heat sink 120 is as previously described with respect to heating unit 100. In this embodiment, heaters 560 are positive temperature coefficient (PTC) heaters, and thus, may also be referred to as PTC heaters 560. However, in other embodiments, one or more of the heaters (e.g., heaters 560) can be other types of heaters such as resistive heaters, capacitive heaters, dielectric heaters, inductive heaters, etc.

Base 510 has a central or longitudinal axis 515 oriented parallel to axis 505, a first or open end 510*a*, a second or closed end 510*b* axially opposite first end 510*a*, and a rectangular prismatic body 512 extending axially between ends 510*a*, 510*b*. Body 512 has a first planar surface 514 extending axially from end 510*a* to end 510*b*, and a second planar surface 516 extending axially from end 510*a* to end 510*b*. Surfaces 514, 516 are oriented parallel to each other and face away from each other. In addition, base 510 includes a recess 518*a* extending axially from first end 510*a* into body 512 and a pocket or cavity 518*b* extending axially from recess 518*a* toward second end 510*b*. It should be appreciated that neither recess 518*a* nor cavity 518*b* extends to or through second end 510*b*. Thus, recess 518*a* defines an opening in end 510*a*, however, there is no opening in end 510*b* (i.e., end 510*b* is closed). In this embodiment, recess 518*a* has a generally rectangular cross-section with semi-cylindrical rounded ends in a plane oriented perpendicular to axis 515, and cavity 518*b* is a rectangular recess that extends axially from recess 518*a* and laterally (relative to axis 515) from surface 514. Thus, cavity 518*b* can be accessed through recess 518*a* and through surface 514.

Figure 12:
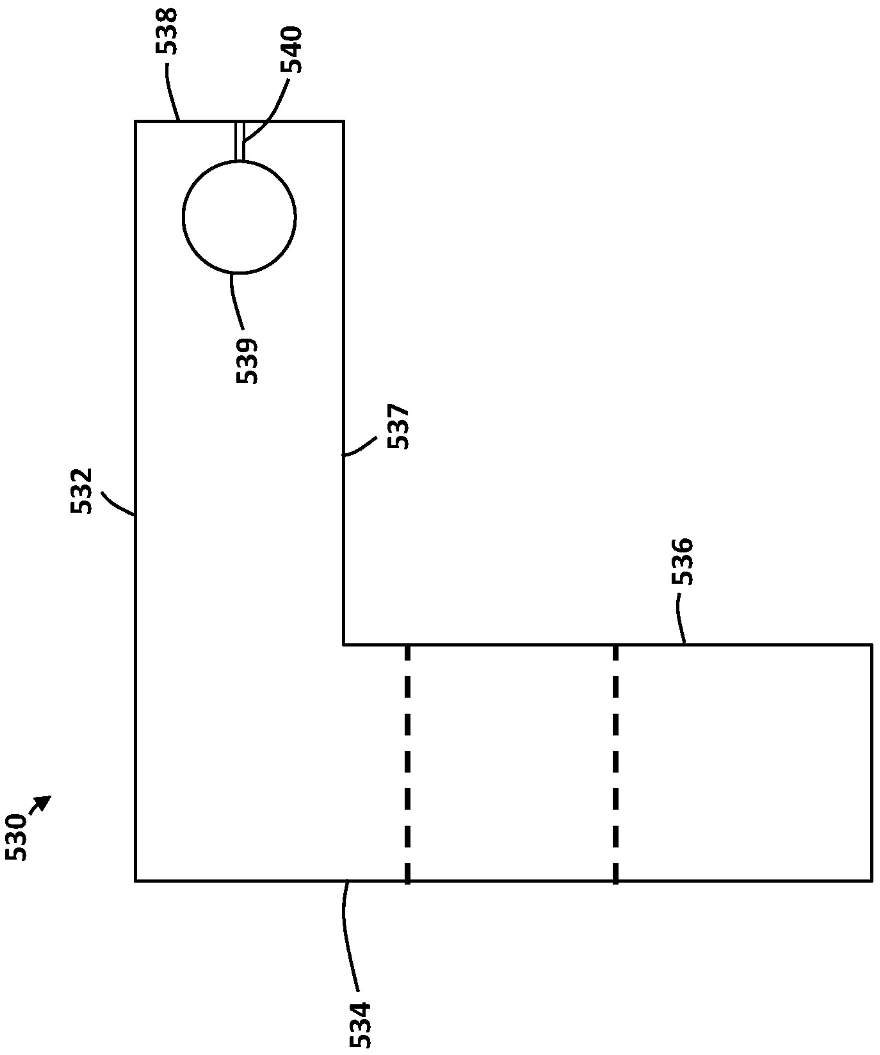
FIG. 12 is a cross-sectional view of the manifold of the heating unit of FIG. 10.

Manifold 530 has a central or longitudinal axis 535, a first end 530*a*, a second end 530*b* axially opposite first end 530*a*, and a body 532 extending axially between ends 530*a*, 530*b*. In this embodiment, body 532 has an L-shaped cross-sectional shape (as opposed to rectangular) in any plane oriented perpendicular to axis 535. Accordingly, as best shown in FIG. 12, body 532 has a first planar face or surface 534, a second planar face or surface 536 opposite and parallel to first surface 534, a third planar face or surface 537 extending perpendicularly from surface 536, and a fourth planar face or surface 538 extending perpendicularly from surface 537. Surfaces 534, 536, 538 are oriented parallel to each other, whereas surface 537 lies in a plane oriented perpendicular to surfaces 534, 536, 538. Surface 537 may be described as a step that extends between surfaces 536, 538. Each surface 534, 536, 537, 538 extends axially from first end 530*a* to second end 530*b*. Inlets 18, 19 as previously described are provided at ends 530*a*, 530*b*, respectively. In this embodiment, inlet 18 is open and used to supply fluid into manifold 530, whereas inlet 19 is plugged and is not used to supply fluid into manifold 530. However, as previously described, in general, inlet 18, inlet 19, or both inlets 18, 19 can be used to supply fluid into manifold 530.

Referring again to FIG. 12, a main passage 539 extends axially (relative to axis 535) through body 532 from first end 530*a* to second end 530*b* and defines inlets 18, 19 at ends 530*a*, 530*b*, respectively. Passage 539 is positioned within body 532 proximal surface 538. A plurality of orifices 540 extend from passage 539 to face 538. Orifices 540 are uniformly axially spaced relative to axis 535, and extend laterally from passage 539 to face 538. In this embodiment, orifices 540 extending from passage 539 generally lie in a plane oriented perpendicular to surfaces 534, 536, 538 and parallel to axis 505 and surface 537. In this embodiment, the axial spacing of orifices 540 is the same as the lateral spacing of channels 126 and fins 124 of heat sink 120 such that an outlet of each orifice 540 along surface 538 is aligned with one channel 126 positioned between a pair of laterally adjacent fins 124 of heat sink 120 when manifold 530 and heat sinks 120 are mounted to bases 510. As will be described in more detail below, a working fluid flows into inlet 18, through passage 539, from passages 539 through orifices 540, and exits orifices 540 at surface 538.

For most sample gas heating applications, main passage 539 has a diameter ranging from about 0.125 in. to about 0.50 in., alternatively from about 0.25 in. to about 0.50 in., and alternately from about 0.375 in. to about 0.50 in. For most sample gas heating applications, each orifice 540 has a diameter ranging from about 0.003 in. to about 0.075 in., alternatively from about 0.010 in. to about 0.050 in., and alternately from about 0.020 in. to about 0.040 in.; and each orifice 249 has a diameter ranging from about 0.003 in. to about 0.075 in., alternatively from about 0.010 in. to about 0.050 in., and alternately from about 0.020 in. to about 0.040 in.

As best shown in FIG. 11, each heater 560 has a central or longitudinal axis 565 oriented parallel to axes 505, 515, a first end 560*a*, a second end 560*b* axially opposite first end 560*a*, and an elongate generally flat body 562 extending axially from first end 560*a* to second end 560*b*. Heaters 560 are disposed in cavity 518*b*. An elongate thermal pad 561 is disposed on both sides of each heater 560 to facilitate the transfer of thermal energy from heaters 560 to heat sink 120 and body 512. In particular, thermal pads 561 positioned between heaters 560 and heat sink 120 are compressed therebetween, and thermal pads 561 positioned between heaters 560 and body 512 are compressed therebetween. In this embodiment, heating unit 500 includes two PTC heaters 560, however, in general, any suitable number of heaters 560 may be used depending on the heat output requirements of heating unit 500.

Referring still to FIG. 11, a temperature sensor 570 is provided within cavity 518*b*. In general, temperature sensor 570 can be any device or sensor that measures and communicates temperature including, without limitation, a resistance temperature detector (RTD) or thermocouple. Temperature sensor 570 may be used to alarm a user when heating unit 500 falls below a particular predetermined temperature (e.g., in the event that PTC heaters 160 fail to operate as intended) to provide temperature feedback for a control system (not specifically shown) that monitors the heaters (e.g., heaters 560), function as an over temperature switch that may disconnect the heaters if the temperatures rises above a predetermined set point temperature, detect failure of the heater(s), or combinations thereof.

Referring again to FIGS. 10 and 11, to assemble heating unit 500, PTC heaters 560 are positioned within cavity 518*b* of base 510, base plate 122 of heat sink 120 is fixably attached to body 512 of base 510, and body 532 of manifold 530 is fixably attached to body 512 of base 512 at end 510*a*. In this embodiment, bolts may be used to attach and compress body 532 against body 512, and to compress body 512 with base plate 122. Base plate 122 engage surface 514 of body 512, and thus, fins 124 generally extend from base 510 away from base 510. Heaters 560 are compressed within cavity 518 between thermal pads 561, body 512, and base plate 122. Manifold 530 is attached to base 510 with surfaces 536, 537 engaging end 510*a*. Fitting 150 is coupled to end 530*a* of manifold 530 in fluid communication with inlet 18. Body 532 of manifold 530 and base plate 122 are positioned such that the outlet end of each orifice 540 along surface 538 is aligned with one channel 126 between each pair of the laterally adjacent fins 124 of the corresponding heat sink 120.

Figure 13:
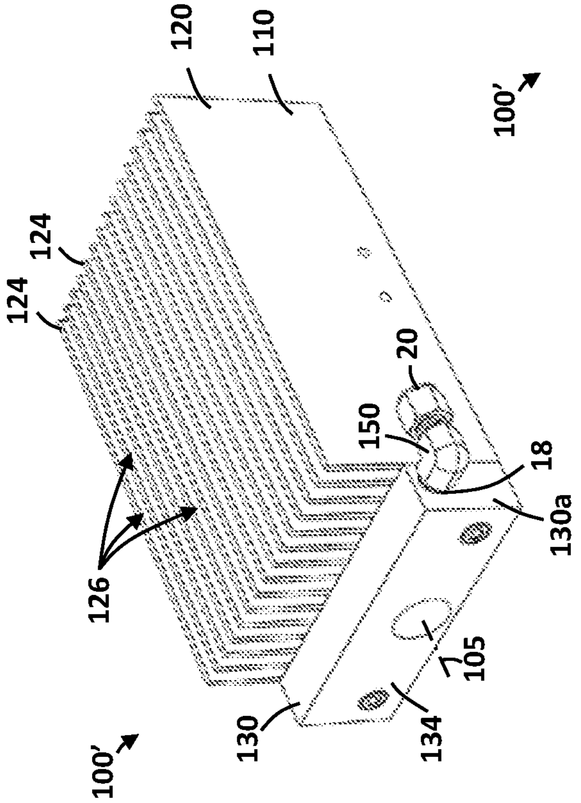
FIG. 13 is an isometric view of an embodiment of a system for heating an enclosure.
Figure 14:
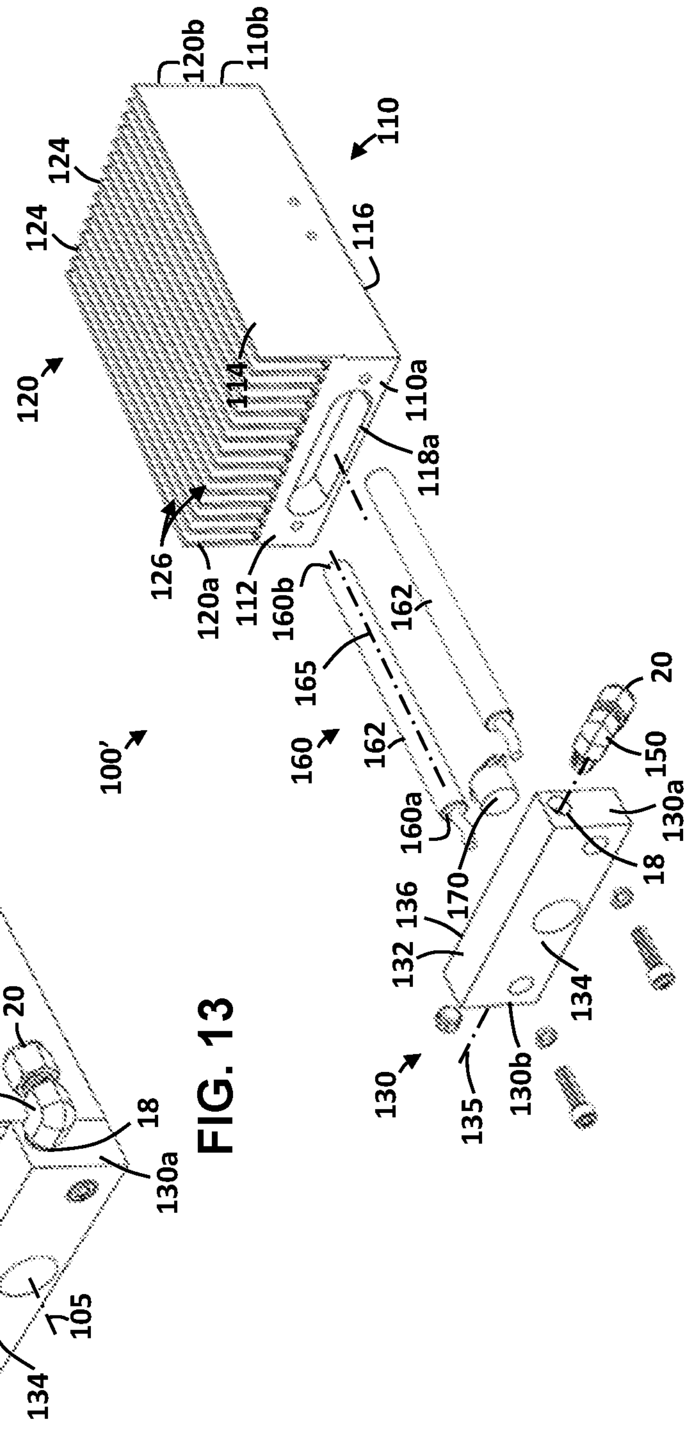
FIG. 14 is an exploded isometric view of the heating unit of FIG. 13.
Figure 15:
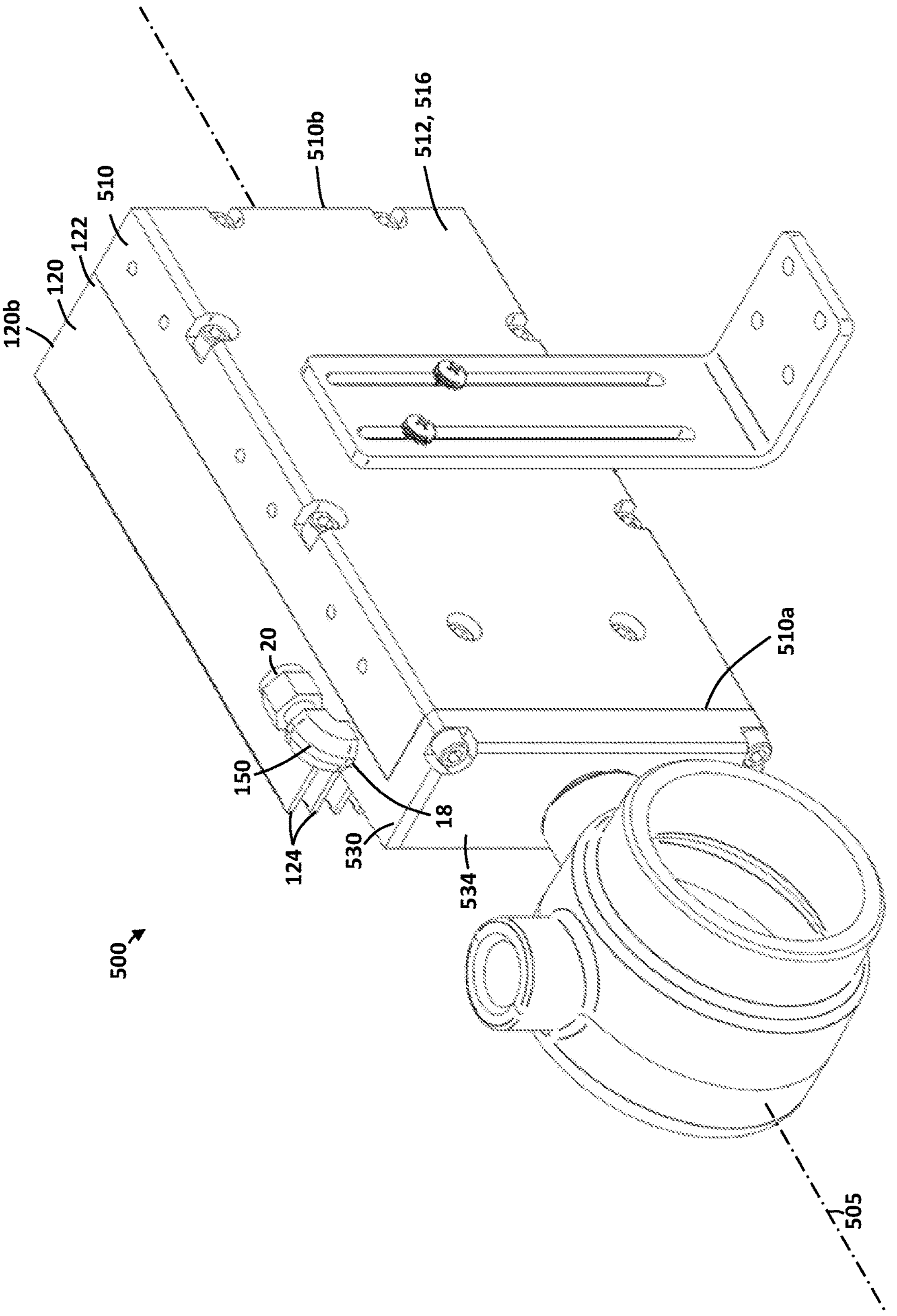
FIG. 15 is an isometric view of an embodiment of a heating unit in accordance with principles described herein.

Referring still to FIGS. 10 and 11, heating unit 500 transfers thermal energy into a system (e.g., system 10) in a similar manner as heating unit 100 previously described. In particular, during operations, a pressurized working fluid is supplied to passage 539 via inlet 18. The pressurized fluid flows through passage 539 to orifices 540. The flow rate of the working fluid into and through passage 539 can be controlled and limited by choke (e.g., choke 20), as well as by the number and diameters of orifices 240. The working fluid flows through passage 539 and into the orifices 540, which emit the working fluid into channels 126 between each pair of laterally adjacent fins 124 of the corresponding heat sink 120 in the same manner as previously described with respect to heating unit 100. In the embodiment shown in FIGS. 10 and 11, PTC heaters 560 transfer thermal energy to base 510 via conduction, base 510 transfer thermal energy to heat sink 120 via conduction, and thermal energy moves through each heat sink 120 from base plate 122 into and through fins 124 via conduction. To enhance conductive heat transfer through and between base 510 and heat sink 120, base 510 and heat sink 120 are made of thermally conductive materials such as metals and metal alloys. In the embodiments of heating units 100, 200, 300, 400, 500 previously described, the base (e.g., base 110, 310, 510), the heat sink (e.g., heat sink 120, 320, 420), the manifold (e.g., manifold 130, 230, 330, 530), and heaters (e.g., PTC heaters 160, 560) are distinct and separate components that are coupled together during assembly to form the corresponding heating unit (e.g., heating unit 100, 200, 300, 400, 500). However, in other embodiments, any two or more of the base, heat sink, manifold, and the heaters may be integral or monolithically formed as a single piece. For example, as shown in FIGS. 13 and 14, an embodiment of a heating unit 100' is shown. Heating unit 100' can be used in place of heating unit 100 in system 10 and is substantially the same as heating unit 100 previously described with the exception that heat sink 120 and base 110 are monolithically formed as a single piece that is subsequently coupled to manifold 130 after the heater(s) 160 are positioned in corresponding cavities 118*b*. As another example, as shown in FIGS. 15 and 16, an embodiment of a heating unit 500' is shown. Heating unit 500' can be used in place of heating unit 100 in system 10 is substantially the same as heating unit 500 previously described with the exception that heat sink 520 and manifold 530 are monolithically formed as a single piece that is subsequently coupled to base 510 after the heater(s) 560 are positioned in corresponding cavity 518*b*.

In the manner described, embodiments disclosed herein include enclosure heaters which maintain surface temperatures within an enclosure below a particular set point, while also maximizing the heat transfer rate between the heated enclosure and a conduit containing a flowing gas stream. In addition, embodiments disclosed herein are directed to enclosure heaters which may be used with Positive Temperature Coefficient type heaters, which may be reliably controlled below a particular set point temperature, while also allowing the use of redundant controls, which may further increase the system reliability.

While exemplary embodiments have been shown and described, modifications thereof can be made by one skilled in the art without departing from the scope or teachings herein. The embodiments described herein are exemplary only and are not limiting. For example, PTC heaters 160 may be provided in any shape (e.g., such as in flat sheets or having an elongated rectangular shape), or may be produced as an integral portion of base 110 and/or heat sink 120. One method for producing an integrated PTC heater 160 may be to directly deposit the PTC material within cavity 118*b* of base 110. In addition, in some embodiments, the base (e.g., base 110) and the heat sink (e.g., heat sink 120) are a single, integral, monolithic structure. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A heating unit for heating a fluid outside of the heating unit and within an inner chamber of an enclosure within which the heating unit is disposed, the heating unit comprising:

a first base having a longitudinal axis, a first end, a second end axially opposite the first end, and a cavity extending axially from the first end;

a first heater disposed in the cavity of the first base;

a first heat sink mounted to the first base, wherein the first heat sink has a central longitudinal axis oriented parallel to the longitudinal axis of the first base, a first end proximal the first end of the first base, and a second end proximal the second end of the first base and axially opposite the first end of the first heat sink, wherein the first heat sink includes a plurality of laterally spaced fins and a plurality of laterally spaced channels, wherein each channel is laterally positioned between a pair of laterally adjacent fins of the plurality of fins; and a manifold coupled to the first end of the first base, wherein the manifold has a central axis, a first end, a second end axially opposite the first end, and an outer surface, wherein the outer surface of the manifold includes a first surface extending axially from the first end to the second end, wherein the first surface of the manifold faces the first base and the first heat sink, wherein the manifold includes a first flow passage and a first plurality of orifices in fluid communication with the first flow passage, wherein each orifice of the first plurality of orifices has an outlet at the first surface that is aligned with one of the channels of the first heat sink, and wherein the first flow passage and the first plurality of orifices are configured to flow a fluid into and through the channels of the first heat sink;

wherein each fin extends axially relative to the longitudinal axis of the first heat sink from the first end of the first heat sink to the second end of the first heat sink and each channel extends axially relative to the longitudinal axis of the first heat sink from the first end of the first heat sink to the second end of the first heat sink that the plurality of fins and the plurality of channels are oriented parallel to each other;

wherein the each channel has a first end at the first end of the first heat sink, a second end at the second end of the first heat sink, a first side proximal the first base and extending from the first end of the channel to the second end of the channel, and a second side distal the first base and extending from the first end of the channel to the second end of the channel;

wherein the first end of each channel, the second end of each channel, and the second side of each channel is open to an environment outside of and surrounding the heating unit.

2. The heating unit of claim 1, wherein the first heater is a PTC heater.

3. The heating unit of claim 2, wherein the first plurality of orifices extend from the first flow passage to the first surface of the manifold.

4. The heating unit of claim 3, wherein the first flow passage extends axially from the first end of the manifold and defines an inlet at the first end of the manifold.

5. The heating unit of claim 2, wherein the first flow passage extends from the outer surface of the manifold and defines an inlet at the outer surface of the manifold, wherein a choke is coupled to the manifold and in fluid communication with the inlet.

6. The heating unit of claim 2, wherein the first heater slidingly engages the first base within the cavity.

7. The heating unit of claim 2, wherein the first heat sink comprises a base plate and the plurality of fins extending from the base plate, wherein the base plate directly engages the first base, and wherein the first surface of the manifold directly engages the first end of the first base.

8. The heating unit of claim 2, wherein the first flow passage has a diameter of 0.50 in. to 0.125 in., and each orifice of the first plurality of orifices has a diameter of 0.075 in. to 0.003 in.

9. A heating unit for heating an enclosure, the heating unit comprising:

a first base having a central axis, a first end, a second end axially opposite the first end, and a cavity extending axially from the first end;

a first heater disposed in the cavity of the first base, wherein the first heater is a PTC heater;

a first heat sink mounted to the first base, wherein the first heat sink has a central axis oriented parallel to the central axis of the first base, a first end proximal the first end of the first base, and a second end proximal the second end of the first base, wherein the first heat sink includes a plurality of laterally spaced fins and a plurality of laterally spaced channels, wherein each channel is laterally positioned between a pair of laterally adjacent fins of the plurality of fins;

a manifold coupled to the first end of the first base, wherein the manifold has a central axis, a first end, a second end axially opposite the first end, and an outer surface, wherein the outer surface of the manifold includes a first surface extending axially from the first end to the second end, wherein the first surface of the manifold faces the first base and the first heat sink, wherein the manifold includes a first flow passage and a first plurality of orifices in fluid communication with the first flow passage, wherein each orifice of the first plurality of orifices has an outlet at the first surface that is aligned with one of the channels of the first heat sink, and wherein the first flow passage and the first plurality of orifices are configured to flow a fluid into and through the channels of the first heat sink;

a second base, wherein the second base has a central axis, a first end, a second end axially opposite the first end, and a cavity extending axially from the first end of the second base, wherein the central axis of the second base is oriented parallel to the central axis of the first base;

a second heater disposed in the cavity of the second base;

a second heat sink mounted to the second base, wherein the second heat sink has a central axis oriented parallel to the central axis of the second base, a first end proximal the first end of the second base, and a second end proximal the second end of the second base, wherein the second heat sink includes a plurality of laterally spaced fins and a plurality of laterally spaced channels, wherein each channel of the second heat sink is laterally positioned between a pair of laterally adjacent fins of the plurality of fins of the second heat sink;

wherein the first surface of the manifold faces the second base and the second heat sink, wherein the manifold includes a second flow passage and a second plurality of orifices in fluid communication with the second flow passage, wherein each orifice of the second plurality of orifices has an outlet at the first surface that is aligned with one of the channels of the second heat sink, and wherein the second flow passage and the orifices of the second plurality of orifices are configured to flow the fluid into and through the channels of the second heat sink.

10. The heating unit of claim 9, wherein the second heater is a PTC heater.

11. The heating unit of claim 10, wherein the second plurality of orifices extend from the second flow passage to the first surface of the manifold.

12. The heating unit of claim 10, wherein the second heater slidingly engages the second base within the cavity of the second base.

13. The heating unit of claim 10, wherein the manifold includes a third flow passage and a third plurality of orifices in fluid communication with the third flow passage, wherein each orifice of the third plurality of orifices has an outlet at the first surface that is aligned with a gap between the first base and the second base, wherein the third flow passage is in fluid communication with the first flow passage and the second flow passage, wherein the third flow passage and the plurality of third orifices are configured to flow the fluid into and through the gap between the first base and the second base.

14. The heating unit of claim 10, wherein the first base and the second base are positioned between the first heat sink and the second heat sink.

* * * * *